(12) United States Patent
Shao

(10) Patent No.: US 12,082,168 B2
(45) Date of Patent: Sep. 3, 2024

(54) SLOT FORMAT INDICATION METHOD AND COMMUNICATION APPARATUS

(71) Applicant: HUAWEI TECHNOLOGIES CO., LTD., Guangdong (CN)

(72) Inventor: Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 17/532,322

(22) Filed: Nov. 22, 2021

(65) Prior Publication Data

US 2022/0086832 A1  Mar. 17, 2022

Related U.S. Application Data

(63) Continuation of application No. PCT/CN2020/089339, filed on May 9, 2020.

(30) Foreign Application Priority Data

May 22, 2019 (CN) .......................... 201910429847.4

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC .......................... H04W 72/0446; H04W 72/23; H04L 5/0048; H04L 5/0053; H04L 5/0007; H04L 67/55; H04L 69/06
See application file for complete search history.

(56) References Cited

U.S. PATENT DOCUMENTS

2019/0191433 A1*  6/2019  Park ................... H04L 27/2666
2019/0268902 A1*  8/2019  Sun ...................... H04L 5/0053
(Continued)

FOREIGN PATENT DOCUMENTS

CA  3080474 A1  5/2019
EP  3442155 A1  2/2019
(Continued)

OTHER PUBLICATIONS

3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.

(Continued)

*Primary Examiner* — Afshawn M Towfighi
(74) *Attorney, Agent, or Firm* — Fish & Richardson P.C.

(57) ABSTRACT

This application provides a slot format indication method and a communication apparatus. The method includes: receiving a slot format index, where the slot format index is used to indicate a row in a slot format table, and the row in the slot format table is used to indicate symbol attributes respectively corresponding to at least 12 symbols, and the symbol attribute includes a location of an uplink symbol U, a downlink symbol D, or a flexible symbol F; and determining a slot format of an extended cyclic prefix based on the slot format index, where the slot format of the extended cyclic prefix includes a downlink symbol D, and at least one uplink symbol U and/or at least one flexible symbol F.

20 Claims, 11 Drawing Sheets

Symbols occupied by an SSB

(56) References Cited

U.S. PATENT DOCUMENTS

2019/0312665 A1\* 10/2019 Jo ..................... H04L 27/2607
2022/0086832 A1\* 3/2022 Shao ..................... H04L 69/06

FOREIGN PATENT DOCUMENTS

| WO | 2018174653 A1 | 9/2018 |
|----|---------------|--------|
| WO | 2018195503 A1 | 10/2018 |
| WO | 2019035584 A1 | 2/2019 |
| WO | 2019052495 A1 | 3/2019 |
| WO | 2019083341 A1 | 5/2019 |

OTHER PUBLICATIONS

LG Electronics, "Remaining issues on group common PDCCH," 3GPP TSG RAN WG1 #93, R1-1806617, Busan, Republic of Korea, May 21-25, 2018, 7 pages.

PCT International Search Report and Written Opinion issued in International Application No. PCT/CN2020/089339 on Jul. 29, 2020, 14 pages (with English translation).

Qualcomm Incorporated, "Resource Management in IAB Network," 3GPP TSG RAN WG1 Meeting #94bis, R1-1811258, Chengdu, China, Oct. 8-12, 2018, 7 pages.

Extended European Search Report issued in European Application No. 20809111.6 on May 30, 2022, 6 pages.

\* cited by examiner

SLOT FORMAT INDICATION METHOD AND COMMUNICATION APPARATUS

CROSS-REFERENCE TO RELATED APPLICATIONS

This application is a continuation of International Application No. PCT/CN2020/089339, filed on May 9, 2020, which claims priority to Chinese Patent Application No. 201910429847.4, filed on May 22, 2019. The disclosures of the aforementioned applications are hereby incorporated by reference in their entireties.

TECHNICAL FIELD

This application relates to the communication field, and more specifically, to a slot format indication method and a communication apparatus.

BACKGROUND

A fifth generation (fifth generation, 5G) mobile communication system is dedicated to supporting higher system performance, and supporting a plurality of service types, different deployment scenarios, and a wider spectrum range. The plurality of service types include an enhanced mobile broadband (enhanced mobile broadband, eMBB) service, a massive machine type communication (massive machine type communication, mMTC) service, an ultra-reliable low-latency communication (ultra-reliable low-latency communication, URLLC) service, a multimedia broadcast multicast service (multimedia broadcast multicast service, MBMS), a positioning service, and the like.

The URLLC service has relatively high requirements on a latency and reliability of data transmission. In some scenarios, the latency requirement cannot be met if a slot with a normal cyclic prefix is used to transmit the URLLC service. Therefore, a slot with an extended cyclic prefix needs to be used to transmit the URLLC service. However, because uplink data and downlink data of the URLLC service coexist, transmitting the URLLC service by using the slot with the extended cyclic prefix cannot ensure that the uplink data and the downlink data of the URLLC service are simultaneously transmitted. Consequently, transmission of the uplink data and the downlink data of the URLLC service is seriously affected, normal running of the URLLC service is affected, and communication efficiency is reduced.

SUMMARY

This application provides a slot format indication method and a communication apparatus. An extended cyclic slot format is determined by using a slot format index used to indicate the slot format of the extended cyclic prefix. The slot format of the extended cyclic prefix can meet uplink transmission, downlink transmission, and a transmission latency requirement of a URLLC service, and normal transmission of an SSB can be ensured. In this way, normal transmission of the URLLC service is ensured.

According to a first aspect, a slot format indication method is provided. The method may be performed by a terminal device or a chip used in the terminal device. In an example in which the method is performed by the terminal device, the method includes: The terminal device receives a slot format index, where the slot format index is used to indicate a row in a slot format table, the row in the slot format table is used to indicate symbol attributes respectively corresponding to at least 12 symbols, the symbol attribute includes a location of an uplink symbol U, a downlink symbol D, or a flexible symbol F, and a value of the slot format index is greater than or equal to 56 and less than or equal to 254. The terminal device determines a slot format of an extended cyclic prefix based on the slot format index, where the slot format of the extended cyclic prefix includes a downlink symbol D, and at least one uplink symbol U and/or at least one flexible symbol F.

According to the slot format indication method provided in the first aspect, a network device sends the slot format index to the terminal device, where the slot format index is used by the terminal device to determine the slot format of the extended cyclic prefix, and the slot format of the extended cyclic prefix includes the downlink symbol D, and the at least one uplink symbol U and/or the at least one flexible symbol F. The slot format of the extended cyclic prefix can meet uplink transmission, downlink transmission, and a transmission latency requirement of a URLLC service, and normal transmission of an SSB can be ensured. In this way, normal transmission of the URLLC service is ensured.

In a possible implementation of the first aspect, the symbol attributes include at least one of the following two types of symbol attributes: a first type of symbol attributes $Y_0$ $Y_1$ $Y_2$ $Z_0$DDDDDDDD $Y_3$ $Y_4$, where D represents a downlink symbol, $Y_0$ to $Y_3$ each represent any one of a flexible symbol, an uplink symbol, and a downlink symbol, $Z_0$ represents a flexible symbol or a downlink symbol, and $Y_4$ represents a flexible symbol or an uplink symbol; and a second type of symbol attributes $X_0$ $X_1$ DDDDDDDD$X_2$ $X_3$ $X_4$ $X_5$, where D represents a downlink symbol, $X_0$ and $X_1$ each represent a flexible symbol or an uplink symbol, $X_2$ represents a flexible symbol or a downlink symbol, $X_3$ represents a flexible symbol or an uplink symbol, and $X_4$ and $X_5$ each represent any one of a flexible symbol, an uplink symbol, and a downlink symbol. Optionally, slot formats corresponding to the two types of symbol attributes are a normal cyclic prefix format corresponding to a 60 kHz subcarrier spacing. In this implementation, the symbol attributes corresponding to the normal cyclic prefix format corresponding to the 60 kHz subcarrier spacing are indicated to the terminal device, so that the terminal device determines a slot format of an extended cyclic prefix at 60 kHz by using only a mapping relationship between the normal cyclic prefix format at 60 kHz and the slot format of the extended cyclic prefix at 60 kHz, and the terminal device can more accurately determine the extended cyclic prefix format at 60 kHz. In this way, complexity of determining the extended cyclic prefix format at 60 kHz by the terminal device is reduced, and the solution is easy to implement.

In a possible implementation of the first aspect, the symbol attributes are $Z_0$ $Z_1$ DDDD $Z_2Z_3$ DDDD $Z_4Z_5$, where $Z_0$ to $Z_5$ each represent a flexible symbol or an uplink symbol, and D represents a downlink symbol. Optionally, a slot format corresponding to the symbol attributes is a normal cyclic prefix format corresponding to a 30 kHz subcarrier spacing. In this implementation, the symbol attributes corresponding to the normal cyclic prefix format corresponding to the 30 kHz subcarrier spacing are indicated to the terminal device, so that the terminal device can more accurately determine an extended cyclic prefix format at 60 kHz. Further, because symbol attributes of only 14 symbols need to be notified, resources occupied by notification of the symbol attributes can be reduced, and resource utilization is improved.

In a possible implementation of the first aspect, the symbol attributes are $Z_0$ DD FDD F $Z_1$ DD $Z_2$DD $Z_3$, where F represents a flexible symbol, $Z_1$ to $Z_3$ each represent a flexible symbol or an uplink symbol, and D represents a downlink symbol. Optionally, a slot format corresponding to the symbol attributes is a normal cyclic prefix format corresponding to a 15 kHz subcarrier spacing. In this implementation, the symbol attributes corresponding to the normal cyclic prefix format corresponding to the 15 kHz subcarrier spacing are indicated to the terminal device, so that the terminal device can more accurately determine an extended cyclic prefix format at 60 kHz based on a mapping relationship between a slot format of a normal cyclic prefix and a slot format of an extended cyclic prefix. Further, because symbol attributes of only 14 symbols need to be notified, resources occupied by notification of the symbol attributes can be reduced, and resource utilization is improved.

In a possible implementation of the first aspect, the symbol attributes include at least one of the following two types of symbol attributes: a first type of symbol attributes $A_0 A_1 A_2$ DDDDDDDDF, where F represents a flexible symbol, D represents a downlink symbol, and $A_0$ to $A_2$ each represent any one of a flexible symbol, an uplink symbol, and a downlink symbol; and a first type of symbol attributes $B_0$ DDDDDDDD$B_1$ $B_2$ $B_3$, where F represents a flexible symbol, D represents a downlink symbol, $B_0$ represents a flexible symbol or an uplink symbol, $B_1$ represents a flexible symbol or a downlink symbol, and $B_2$ and $B_3$ each represent any one of a flexible symbol, an uplink symbol, and a downlink symbol. Optionally, slot formats corresponding to the two types of symbol attributes are an extended cyclic prefix format corresponding to a 60 kHz subcarrier spacing. In this implementation, the symbol attributes corresponding to the extended cyclic prefix format corresponding to the 60 kHz subcarrier spacing are indicated to the terminal device, so that the terminal device may directly perform transmission of uplink and downlink data and an SSB based on the indicated extended cyclic prefix format at 60 kHz. The terminal device does not need to perform slot format mapping. In this way, complexity of determining the extended cyclic prefix format at 60 kHz by the terminal device is reduced, and the solution is easy to implement.

In a possible implementation of the first aspect, the symbol attributes are $Z_0 Z_1$ DDD$C_0 C_1$ DDD$Z_2 Z_3$, where $Z_0$ represents a flexible symbol or an uplink symbol, $Z_1$ represents a flexible symbol or a downlink symbol, D represents a downlink symbol, $C_0$ and $C_1$ each represent a flexible symbol or a downlink symbol, $Z_2$ represents a flexible symbol or a downlink symbol, and $Z_3$ represents any one of a flexible symbol, an uplink symbol, and a downlink symbol. Optionally, a slot format corresponding to the symbol attributes is an extended cyclic prefix format corresponding to a 30 kHz subcarrier spacing. In this implementation, the symbol attributes corresponding to the extended cyclic prefix format corresponding to the 30 kHz subcarrier spacing are indicated to the terminal device, so that the terminal device determines a slot format of an extended cyclic prefix at 60 kHz by using only a mapping relationship between the extended cyclic prefix format at 60 kHz and the slot format of the extended cyclic prefix at 30 kHz, and the terminal device can more accurately determine the extended cyclic prefix format at 60 kHz. In this way, complexity of determining the extended cyclic prefix format at 60 kHz by the terminal device is reduced. Further, because symbol attributes of only 12 symbols need to be notified, resources occupied by notification of the symbol attributes can be reduced, and resource utilization is improved.

In a possible implementation of the first aspect, the symbol attributes are $C_0$ DD DD $C_1 C_2$ DD DD $C_3$, where $C_0$ to $C_3$ each represent a flexible symbol or a downlink symbol, and D represents a downlink symbol. Optionally, a slot format corresponding to the symbol attributes is an extended cyclic prefix format corresponding to a 15 kHz subcarrier spacing. In this implementation, the symbol attributes corresponding to the extended cyclic prefix format corresponding to the 15 kHz subcarrier spacing are indicated to the terminal device, so that the terminal device determines a slot format of an extended cyclic prefix at 60 kHz by using only a mapping relationship between the extended cyclic prefix format at 60 kHz and a slot format of an extended cyclic prefix at 15 kHz, and the terminal device can more accurately determine the extended cyclic prefix format at 60 kHz. In this way, complexity of determining the extended cyclic prefix format at 60 kHz by the terminal device is reduced. Further, because symbol attributes of only 12 symbols need to be notified, resources occupied by notification of the symbol attributes can be reduced, and resource utilization is improved.

In a possible implementation of the first aspect, symbols indicated by the slot format index are 12 symbols in 14 symbols indicated by the row in the slot format table. In this implementation, the symbols indicated by the slot format index are the 12 symbols in the 14 symbols indicated by the row in the slot format table. Because the terminal device performs transmission of uplink and downlink data by finally using 12 symbols in an extended cyclic prefix format, symbol attributes of the 12 symbols indicated by the slot format index can be more accurately and conveniently determined. In this way, complexity of determining the symbol attributes of the 12 symbols indicated by the slot format index is reduced, and the solution is easy to implement. In addition, accuracy of the symbol attributes of the 12 symbols indicated by the slot format index is improved.

In a possible implementation of the first aspect, the 12 symbols are first 12 symbols, last 12 symbols, or the first symbol to the sixth symbol and the eighth symbol to the thirteenth symbol in the 14 symbols. In this implementation, the symbols indicated by the slot format index are the first 12 symbols, the last 12 symbols, or the first symbol to the sixth symbol and the eighth symbol to the thirteenth symbol in the 14 symbols indicated by the row in the slot format table. Symbol attributes of the 12 symbols indicated by the slot format index can be more accurately and conveniently determined. In this way, complexity of determining the symbol attributes of the 12 symbols indicated by the slot format index is reduced, and the solution is easy to implement. In addition, an extended cyclic prefix format at 60 kHz determined by the terminal device based on the symbol attributes of the 12 symbols indicated by the slot format index can meet transmission of a URLLC uplink service and a URLLC downlink service, and SSB transmission can be ensured. This ensures communication quality and efficiency.

In a possible implementation of the first aspect, the symbol attributes of the 14 symbols indicated by the slot format index include: A downlink symbol D and an uplink symbol U are two consecutive symbols, and a symbol index of the downlink symbol D is less than a symbol index of the uplink symbol U. A subcarrier spacing corresponding to a slot format indicated by the slot format index is less than or equal to a subcarrier spacing corresponding to the slot format of the extended cyclic prefix. In this implementation, the symbol attributes of the 14 symbols indicated by using the slot format index include symbol attributes of D and U that are two consecutive symbols, where a symbol index of D is less than a symbol index of U, so that a quantity and a type of slot format indexes used to indicate the symbol attributes of the 14 symbols may be increased, in other words, more types of the symbol attributes of the 14 symbols may be used to indicate the extended cyclic prefix format. A more flexible indication of the symbol attributes of the 14 symbols is implemented. In addition, an extended cyclic prefix format at 60 kHz determined by the terminal device based on the symbol attributes of the 14 symbols indicated by the slot format index meets transmission of a URLLC uplink service and a URLLC downlink service, so that communication quality and efficiency are ensured.

In a possible implementation of the first aspect, the method further includes: The terminal device sends first indication information, where the first indication information is used to indicate that the terminal device supports receiving a synchronization broadcast block (SS/PBCH block) in a slot with the extended cyclic prefix.

In a possible implementation of the first aspect, the method further includes: The terminal device receives second indication information, where the second indication information is used to indicate the terminal device to receive the synchronization broadcast block (SS/PBCH block) in the slot with the extended cyclic prefix.

In a possible implementation of the first aspect, the subcarrier spacing corresponding to the slot format indicated by the slot format index is less than or equal to the subcarrier spacing corresponding to the slot format of the extended cyclic prefix.

In a possible implementation of the first aspect, the subcarrier spacing corresponding to the slot format of the extended cyclic prefix is any one of a 30 kHz subcarrier spacing, a 60 kHz subcarrier spacing, a 120 kHz subcarrier spacing, and a 240 kHz subcarrier spacing.

According to a second aspect, a slot format indication method is provided. The method may be performed by a network device or a chip used in the network device. In an example in which the method is performed by the network device, the method includes: The network device determines a slot format index based on a slot format of an extended cyclic prefix, where the slot format of the extended cyclic prefix includes a downlink symbol D, and at least one uplink symbol U and/or at least one flexible symbol F, the slot format index is used to indicate a row in a slot format table, the row in the slot format table is used to indicate symbol attributes respectively corresponding to at least 12 symbols, the symbol attribute includes a location of an uplink symbol U, a downlink symbol D, or a flexible symbol F, and a value of the slot format index is greater than or equal to 56 and less than or equal to 254. The network device sends the slot format index.

According to the slot format indication method provided in the second aspect, the network device sends the slot format index to a terminal device, where the slot format index is used by the terminal device to determine the slot format of the extended cyclic prefix, and the slot format of the extended cyclic prefix includes the downlink symbol D, and the at least one uplink symbol U and/or the at least one flexible symbol F. The slot format of the extended cyclic prefix can meet uplink transmission, downlink transmission, and a transmission latency requirement of a URLLC service, and normal transmission of an SSB can be ensured. In this way, normal transmission of the URLLC service is ensured.

In a possible implementation of the second aspect, the symbol attributes include at least one of the following two types of symbol attributes: a first type of symbol attributes $Y_0\ Y_1\ Y_2\ Z_0DDDDDDDD\ Y_3\ Y_4$, where D represents a downlink symbol, $Y_0$ to $Y_3$ each represent any one of a flexible symbol, an uplink symbol, and a downlink symbol, $Z_0$ represents a flexible symbol or a downlink symbol, and $Y_4$ represents a flexible symbol or an uplink symbol; and a second type of symbol attributes $X_0\ X_1\ DDDDDDDDX_2\ X_3\ X_4\ X_5$, where D represents a downlink symbol, $X_0$ and $X_1$ each represent a flexible symbol or an uplink symbol, $X_2$ represents a flexible symbol or a downlink symbol, $X_3$ represents a flexible symbol or an uplink symbol, and $X_4$ and $X_5$ each represent any one of a flexible symbol, an uplink symbol, and a downlink symbol.

In a possible implementation of the second aspect, the symbol attributes are $Z_0\ Z_1\ DDDD\ Z_2Z_3\ DDDD\ Z_4Z_5$, where $Z_0$ to $Z_5$ each represent a flexible symbol or an uplink symbol, and D represents a downlink symbol.

In a possible implementation of the second aspect, the symbol attributes are $Z_0\ DD\ FDD\ F\ Z_1\ DD\ Z_2DD\ Z_3$, where F represents a flexible symbol, $Z_1$ to $Z_3$ each represent a flexible symbol or an uplink symbol, and D represents a downlink symbol.

In a possible implementation of the second aspect, the symbol attributes include at least one of the following two types of symbol attributes: a first type of symbol attributes $A_0\ A_1\ A_2\ DDDDDDDDF$, where F represents a flexible symbol, D represents a downlink symbol, and $A_0$ to $A_2$ each represent any one of a flexible symbol, an uplink symbol, and a downlink symbol; and a first type of symbol attributes $B_0\ DDDDDDDDB_1\ B_2\ B_3$, where F represents a flexible symbol, D represents a downlink symbol, $B_0$ represents a flexible symbol or an uplink symbol, $B_1$ represents a flexible symbol or a downlink symbol, and $B_2$ and $B_3$ each represent any one of a flexible symbol, an uplink symbol, and a downlink symbol.

In a possible implementation of the second aspect, the symbol attributes are $Z_0\ Z_1\ DDDC_0\ C_1\ DDDZ_2\ Z_3$, where $Z_0$ represents a flexible symbol or an uplink symbol, $Z_1$ represents a flexible symbol or a downlink symbol, D represents a downlink symbol, $C_0$ and $C_1$ each represent a flexible symbol or a downlink symbol, $Z_2$ represents a flexible symbol or a downlink symbol, and $Z_3$ represents any one of a flexible symbol, an uplink symbol, and a downlink symbol.

In a possible implementation of the second aspect, the symbol attributes are $C_0\ DD\ DD\ C_1\ C_2\ DD\ DD\ C_3$, where $C_0$ to $C_3$ each represent a flexible symbol or a downlink symbol, and D represents a downlink symbol.

In a possible implementation of the second aspect, symbols indicated by the slot format index are 12 symbols in 14 symbols indicated by the row in the slot format table.

In a possible implementation of the second aspect, the 12 symbols are first 12 symbols, last 12 symbols, or the first symbol to the sixth symbol and the eighth symbol to the thirteenth symbol in the 14 symbols.

In a possible implementation of the second aspect, the symbol attributes of the 14 symbols indicated by the slot format index include: A downlink symbol D and an uplink symbol U are two consecutive symbols, and a symbol index of the downlink symbol D is less than a symbol index of the uplink symbol U. A subcarrier spacing corresponding to a slot format indicated by the slot format index is less than or equal to a subcarrier spacing corresponding to the slot format of the extended cyclic prefix.

In a possible implementation of the second aspect, the method further includes: The network device receives first indication information, where the first indication information is used to indicate that the terminal device supports receiving a synchronization broadcast block (SS/PBCH block) in a slot with the extended cyclic prefix.

In a possible implementation of the second aspect, the method further includes: The network device receives second indication information, where the second indication information is used to indicate the terminal device to receive the synchronization broadcast block (SS/PBCH block) in the slot with the extended cyclic prefix.

In a possible implementation of the second aspect, the subcarrier spacing corresponding to the slot format indicated by the slot format index is less than or equal to the subcarrier spacing corresponding to the slot format of the extended cyclic prefix.

In a possible implementation of the second aspect, the subcarrier spacing corresponding to the slot format of the extended cyclic prefix is any one of a 30 kHz subcarrier spacing, a 60 kHz subcarrier spacing, a 120 kHz subcarrier spacing, and a 240 kHz subcarrier spacing.

According to a third aspect, a communication apparatus is provided. The apparatus has a function of implementing behavior of the terminal device in the foregoing method designs. The function may be implemented by hardware, or may be implemented by hardware executing corresponding software. The hardware or the software includes one or more modules corresponding to the foregoing function. The module may be software and/or hardware.

In a possible design, a structure of the terminal device includes a transmitter and a processor, where the processor is configured to support the terminal device in performing corresponding function in the foregoing method. The transmitter is configured to: support communication between a network device and the terminal device, and send information or instructions in the foregoing method to the network device. The terminal device may further include a memory. The memory is configured to couple to the processor, and the memory stores program instructions and data that are necessary for the network device.

According to a fourth aspect, a communication apparatus is provided. The apparatus has a function of implementing behavior of the network device in the foregoing method designs. The function may be implemented by hardware, or may be implemented by hardware executing corresponding software. The hardware or the software includes one or more modules corresponding to the foregoing function.

In a possible design, a structure of the network device includes a processor and a receiver, where the processor is configured to support the network device in performing corresponding function in the foregoing method. The receiver is configured to: support communication between the network device and a terminal device, and receive information or instructions sent by the terminal device in the foregoing method. The network device may further include a memory. The memory is configured to couple to the processor, and the memory stores program instructions and data that are necessary for the network device.

According to a fifth aspect, a computer storage medium is provided. The computer storage medium is configured to store computer software instructions used by the terminal device, and includes a program designed for performing any one of the first aspect or the possible implementations of the first aspect.

According to a sixth aspect, a computer storage medium is provided. The computer storage medium is configured to store computer software instructions used by the network device, and includes a program designed for performing any one of the second aspect or the possible implementations of the second aspect.

According to a seventh aspect, a computer program product is provided. The computer program product includes a computer program. When being executed by a processor, the computer program is used to perform the method according to any one of the first aspect or the possible implementations of the first aspect, or perform the method according to any one of the second aspect or the possible implementations of the second aspect.

According to an eighth aspect, a chip system is provided. The chip system includes a processor, configured to support a terminal device in implementing functions in the foregoing aspects, for example, generating, receiving, determining, sending, or processing data and/or information in the foregoing method. In a possible design, the chip system further includes a memory. The memory is configured to store program instructions and data that are necessary for the terminal device. The chip system may include a chip, or may include a chip and another discrete device.

According to a ninth aspect, a chip system is provided. The chip system includes a processor, configured to support a network device in implementing functions in the foregoing aspects, for example, generating, receiving, determining, sending, or processing data and/or information in the foregoing method. In a possible design, the chip system further includes a memory. The memory is configured to store program instructions and data that are necessary for a terminal device. The chip system may include a chip, or may include a chip and another discrete device.

DESCRIPTION OF EMBODIMENTS

Figure 1:
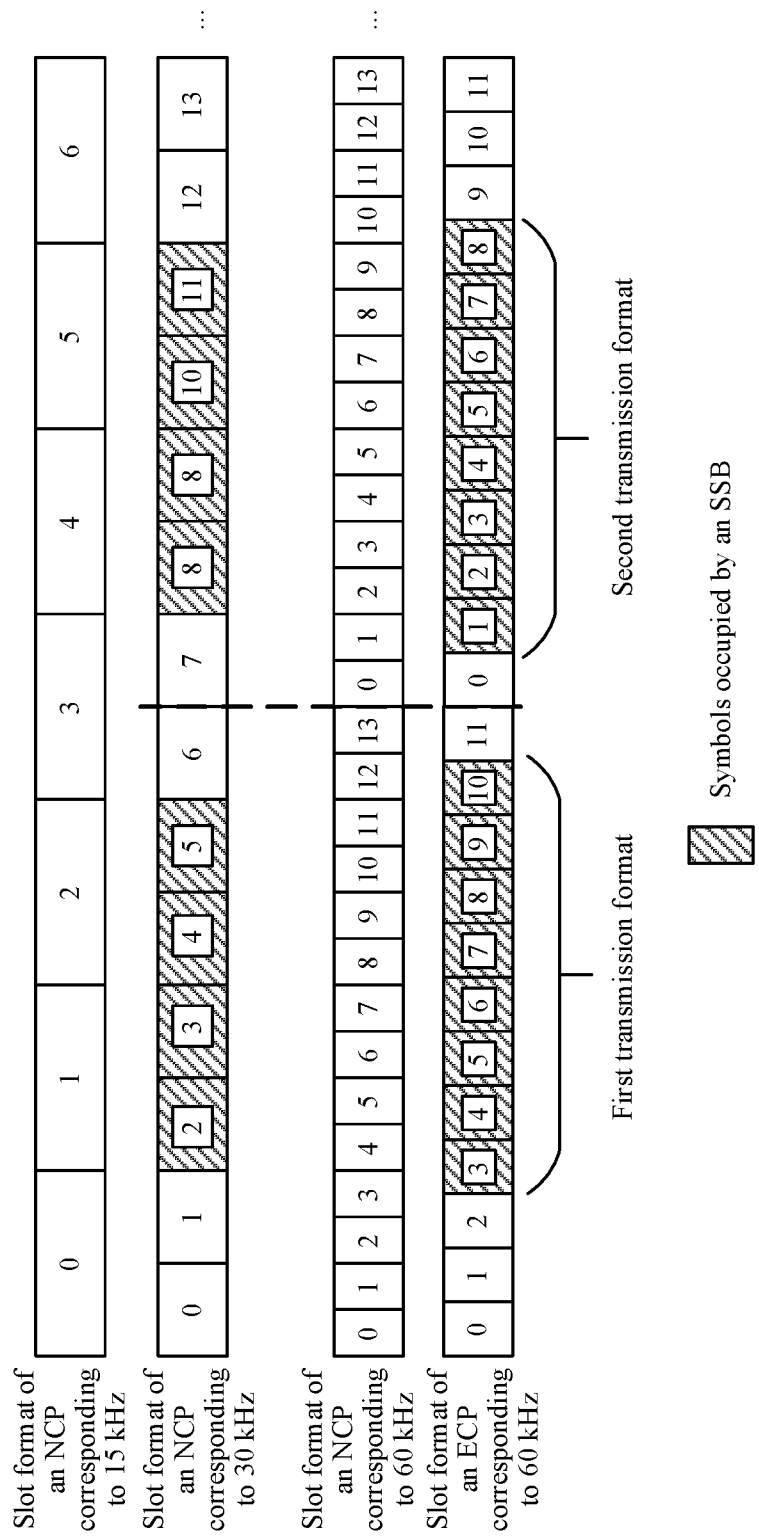
FIG. 1 shows symbol locations at which an SSB corresponding to Case C is mapped to an NCP and an ECP corresponding to a 60 kHz subcarrier spacing.

The following describes the technical solutions in this application with reference to the accompanying drawings.

The technical solutions of embodiments of this application may be applied to various communication systems, for example, a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a future 5th generation (5th generation, 5G) system, or a new radio (new radio, NR) system.

A terminal device in the embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A network device in the embodiments of this application may be a device configured to communicate with the terminal device. The network device may be a base transceiver station (base transceiver station, BTS) in global system for mobile communications (global system for mobile communications, GSM) or code division multiple access (code division multiple access, CDMA), or may be a NodeB (NodeB, NB) in a wideband code division multiple access (wideband code division multiple access, WCDMA) system, or may be an evolved NodeB (evolved NodeB, eNB or eNodeB) in an LTE system, or may be a radio controller in a cloud radio access network (cloud radio access network, CRAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant communication software. In addition, the embodiments of this application impose no special limitation on a specific structure of an execution body of the method provided in the embodiments of this application, provided that a program that records code of the method provided in the embodiments of this application can be run to perform communication according to the method provided in the embodiments of this application. For example, the method provided in the embodiments of this application may be performed by the terminal device or the network device, or may be performed by a functional module that is in the terminal device or the network device and that can invoke and execute a program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage device (for example, a hard disk, a floppy disk, or a magnetic tape), an optical disc (for example, a compact disc (compact disc, CD), a digital versatile disc (digital versatile disc, DVD), or the like), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

A fifth generation (fifth generation, 5G) mobile communication system is dedicated to supporting higher system performance, and supporting a plurality of service types, different deployment scenarios, and a wider spectrum range. The plurality of service types include an enhanced mobile broadband (enhanced mobile broadband, eMBB) service, a massive machine type communication (massive machine type communication, mMTC) service, an ultra-reliable low-latency communication (ultra-reliable low-latency communication, URLLC) service, a multimedia broadcast multicast service (multimedia broadcast multicast service, MBMS), a positioning service, and the like.

A typical URLLC service has a relatively high requirement on a data transmission latency. The URLLC service mainly includes wireless control in industrial manufacturing or a production process, motion control of an unmanned vehicle and an unmanned aircraft, and tactile interaction applications such as remote repair and remote surgery. The services are mainly characterized by ultra-high reliability, a low latency, a relatively small data transmission amount, and burstiness.

A typical mMTC service includes smart grid power distribution automation and smart city. The services are mainly characterized by a large quantity of networked devices, a relatively small data transmission amount, and insensitivity of data to a transmission latency. mMTC communication devices need to meet requirements on low costs and very long standby time.

A typical eMBB service is insensitive to a data transmission latency and has a large amount of transmitted data. The typical eMBB service mainly includes an ultra-high-definition video, augmented reality (augmented reality, AR), virtual reality (virtual reality, VR), and the like. The services are mainly characterized by a large data transmission amount and a very high transmission rate.

Currently, an NR system supports scheduling of various time units, and a length of a time unit may be one or more time domain symbols. The symbol may be an orthogonal frequency division multiplexing (orthogonal frequency division multiplexing, OFDM) symbol. A time domain resource of the NR system includes a slot (slot). For a slot format of a normal cyclic prefix (normal cyclic prefix, NCP), one slot includes 14 symbols. For a slot format of an extended cyclic prefix (extended cyclic prefix, ECP), one slot includes 12 symbols. The NR system supports a plurality of subcarrier spacings. When subcarrier spacings are different, time lengths corresponding to the slot slot are different. For example, when the subcarrier spacing is 15 kHz, a time length corresponding to a slot is 1 ms; when the subcarrier spacing is 30 kHz, a time length corresponding to a slot is 0.5 ms; when the subcarrier spacing is 60 kHz, a time length corresponding to a slot is 0.25 ms; when the subcarrier spacing is 120 kHz, a time length corresponding to a slot is 0.125 ms. Because a quantity of symbols in one slot is always 14 or 12, it may be understood that a time length corresponding to one symbol also varies with the subcarrier spacing.

The network device notifies, by using physical layer signaling or higher layer signaling, distribution of an uplink symbol (Uplink Symbol, U), a downlink symbol (Downlink Symbol, D), and a flexible symbol (Flexible Symbol, F) in one of one or more slots. The uplink symbol is used to transmit uplink data and/or uplink control information. The downlink symbol is used to transmit downlink data and/or downlink control information. The flexible symbol may be used to transmit uplink data and/or uplink control information, or downlink data and/or downlink control information. Whether the flexible symbol is used for uplink transmission or downlink transmission depends on downlink control information (downlink control information, DCI) of the network device. When the network device indicates, by using the DCI, that a slot resource is an uplink channel, and the resource includes a flexible symbol, the flexible symbol is used to transmit the uplink data and/or the uplink control information. When the network device indicates, by using the downlink control information (DCI), that a time domain resource is a downlink channel, and the time domain resource includes a flexible symbol, the flexible symbol is used to transmit the downlink data and/or the downlink control information. However, the flexible symbol usually cannot carry the uplink data and/or the uplink control information, and the downlink data and/or the downlink control information at the same time.

Currently, the network device indicates locations of U, D, and F in a slot to the terminal device by using a slot format indication (slot format indication, SFI). For example, Table 1 is a slot format indication table for a slot format of a normal cyclic prefix.

TABLE 1

| Slot format (format) index | Symbol indexes in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |

TABLE 1-continued

| Slot format (format) index | Symbol indexes in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | D | D | D | D | D | D | D |
| 56-254 | Reserved value | | | | | | | | | | | | | |
| 255 | The terminal device determines the slot format only "by using higher layer signaling (TDD-UL-DL-Configuration Common) or higher layer signaling (TDD-UL-DL-Config Dedicated), or based on a detected DCI indication". | | | | | | | | | | | | | |

For a slot with the normal cyclic prefix, because slot lengths corresponding to different subcarrier spacings are different, a symbol correspondence between different subcarriers may be used to determine whether a symbol included in a slot with one subcarrier spacing is an uplink symbol, a downlink symbol, or a flexible symbol. For example, a slot corresponding to the 15 kHz subcarrier spacing is equivalent to two slots corresponding to the 30 kHz subcarrier spacing, and a time length of one symbol corresponding to the 15 kHz subcarrier spacing is the same as a total time length of two symbols corresponding to the 30 kHz subcarrier spacing. In this case, one U corresponding to the 15 kHz subcarrier spacing may be mapped to (correspond to) two Us corresponding to the 30 kHz subcarrier spacing, one D corresponding to the 15 kHz subcarrier spacing may be mapped to two Ds corresponding to the 30 kHz subcarrier spacing, and one F corresponding to the 15 kHz subcarrier spacing may be mapped to two Fs corresponding to the 30 kHz subcarrier spacing. Similarly, for a slot format corresponding to the 15 kHz subcarrier spacing and the 60 kHz subcarrier spacing, a time length of one symbol corresponding to the 15 kHz subcarrier spacing is the same as a total time length of four symbols corresponding to the 60 kHz subcarrier spacing. In this case, one U corresponding to the 15 kHz subcarrier spacing may be mapped to four Us corresponding to the 60 kHz subcarrier spacing, one D corresponding to the 15 kHz subcarrier spacing may be mapped to four Ds corresponding to the 60 kHz subcarrier spacing, and one F corresponding to the 15 kHz subcarrier spacing may be mapped to four Fs corresponding to the 60 kHz subcarrier spacing. Similarly, for slot formats corresponding to the 30 kHz subcarrier spacing and the 60 kHz subcarrier spacing, slot formats corresponding to the 30 kHz subcarrier spacing and the 120 kHz subcarrier spacing, and the like, the foregoing mapping relationship may also be used to determine a slot format of a corresponding subcarrier spacing.

In addition, for a slot with the extended cyclic prefix, for a same subcarrier spacing, a time length of the slot corresponding to the ECP is the same as a time length of the slot corresponding to the NCP, and slot boundaries are aligned. It is defined according to an existing protocol that the slot format corresponding to the ECP is determined based on the slot format corresponding to the NCP. A specific implementation method is as follows:

If one ECP symbol (ECP symbol) overlaps D or U of an NCP symbol (even if the ECP symbol also overlaps F), a direction of the ECP symbol is the same as a direction of the NCP symbol.

For example, if the ECP symbol overlaps DD, DF, or FD of the NCP, the ECP symbol corresponds to D. If the ECP symbol overlaps UU, UF, or FU of the NCP, the ECP symbol corresponds to U.

If one ECP symbol overlaps only F of an NCP symbol, the ECP symbol is F.

For example, if the ECP symbol overlaps FF of the NCP, the ECP symbol corresponds to F.

If one ECP symbol overlaps both D and U of an NCP symbol, the ECP symbol is F.

For example, if the ECP symbol overlaps DU of the NCP, the ECP symbol corresponds to F.

According to the foregoing implementation, the slot format corresponding to the ECP may be determined. Table 2 shows an ECP slot format table corresponding to the 60 kHz subcarrier spacing.

TABLE 2

| Slot format (format) index | Symbol indexes in a slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | D | D | D | D | D | D | D | D | D | D | D | D |
| 1 | U | U | U | U | U | U | U | U | U | U | U | U |
| 2 | F | F | F | F | F | F | F | F | F | F | F | F |
| 3 | D | D | D | D | D | D | D | D | D | D | D | D |
| 4 | D | D | D | D | D | D | D | D | D | D | D | F |
| 5 | D | D | D | D | D | D | D | D | D | D | F | F |
| 6 | D | D | D | D | D | D | D | D | D | F | F | F |
| 7 | D | D | D | D | D | D | D | D | F | F | F | F |

TABLE 2-continued

| Slot format (format) index | Symbol indexes in a slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 8 | F | F | F | F | F | F | F | F | F | F | F | U |
| 9 | F | F | F | F | F | F | F | F | F | F | U | U |
| 10 | U | U | U | U | U | U | U | U | U | U | U | U |
| 11 | F | U | U | U | U | U | U | U | U | U | U | U |
| 12 | F | F | U | U | U | U | U | U | U | U | U | U |
| 13 | F | F | F | U | U | U | U | U | U | U | U | U |
| 14 | F | F | F | F | U | U | U | U | U | U | U | U |
| 15 | F | F | F | F | F | U | U | U | U | U | U | U |
| 16 | D | F | F | F | F | F | F | F | F | F | F | F |
| 17 | D | D | F | F | F | F | F | F | F | F | F | F |
| 18 | D | D | D | F | F | F | F | F | F | F | F | F |
| 19 | D | F | F | F | F | F | F | F | F | F | F | U |
| 20 | D | D | F | F | F | F | F | F | F | F | F | U |
| 21 | D | D | D | F | F | F | F | F | F | F | F | U |
| 22 | D | F | F | F | F | F | F | F | F | F | U | U |
| 23 | D | D | F | F | F | F | F | F | F | F | U | F |
| 24 | D | D | D | F | F | F | F | F | F | F | U | F |
| 25 | D | F | F | F | F | F | F | F | F | U | U | U |
| 26 | D | D | F | F | F | F | F | F | F | U | U | U |
| 27 | D | D | D | F | F | F | F | F | F | U | U | U |
| 28 | D | D | D | D | D | D | D | D | D | D | D | D |
| 29 | D | D | D | D | D | D | D | D | D | D | F | U |
| 30 | D | D | D | D | D | D | D | D | D | F | F | U |
| 31 | D | D | D | D | D | D | D | D | D | U | U | U |
| 32 | D | D | D | D | D | D | D | D | F | U | U | U |
| 33 | D | D | D | D | D | D | D | F | F | U | U | U |
| 34 | D | U | U | U | U | U | U | U | U | U | U | U |
| 35 | D | D | U | U | U | U | U | U | U | U | U | U |
| 36 | D | D | D | U | U | U | U | U | U | U | U | U |
| 37 | D | F | U | U | U | U | U | U | U | U | U | U |
| 38 | D | D | F | U | U | U | U | U | U | U | U | U |
| 39 | D | D | D | F | U | U | U | U | U | U | U | U |
| 40 | D | F | U | U | U | U | U | U | U | U | U | U |
| 41 | D | D | F | U | U | U | U | U | U | U | U | U |
| 42 | D | D | D | F | U | U | U | U | U | U | U | U |
| 43 | D | D | D | D | D | D | D | F | F | F | U | U |
| 44 | D | D | D | D | D | F | F | F | F | U | U | U |
| 45 | D | D | D | D | D | U | U | U | U | U | U | U |
| 46 | D | D | D | D | U | D | D | D | D | D | D | U |
| 47 | D | D | U | U | U | D | D | U | U | U | U | U |
| 48 | D | U | U | U | U | D | U | U | U | U | U | U |
| 49 | D | D | D | F | U | D | D | D | F | U | U | U |
| 50 | D | D | F | U | U | D | F | U | U | U | U | U |
| 51 | D | F | U | U | U | D | F | U | U | U | U | U |
| 52 | D | F | F | F | U | D | F | F | F | F | U | U |
| 53 | D | F | F | U | U | D | F | F | U | U | U | U |
| 54 | F | F | F | F | F | D | D | D | D | D | D | D |
| 55 | D | D | F | F | U | U | F | D | D | D | D | D |
| 56-254 | Reserved value | | | | | | | | | | | |
| 255 | The terminal device determines the slot format only "by using higher layer signaling (TDD-UL-DL-Configuration Common) or higher layer signaling (TDD-UL-DL-Config Dedicated), or based on a detected DCI indication". | | | | | | | | | | | |

It may be found that a slot format 3 indicated by the slot format index 3 in Table 2 is the same as a slot format indicated by the slot format index 1. Slot formats corresponding to the slot format indexes 28, 31, 34-36, and 45-47 in Table 2 cannot be used because there is no F in D→U. As defined in the standard, there must be F between D and U because the terminal device needs conversion time between downlink receiving and uplink sending. These formats cannot be used because no conversion time is reserved. However, there can be no F in U→D.

In a wireless communication system, a reference signal needs to be transmitted during uplink data transmission (sent from the terminal device to the network device) or downlink data transmission (sent from the network device to the terminal device). This is because before performing data decoding, a receive end needs to perform channel estimation on a channel by using the reference signal, and then eliminates impact of a spatial channel on data by using a result of the channel estimation, to perform the decoding. For example, a synchronization signal block (Synchronization Signal Block, SSB) or a physical broadcast channel block (physical broadcast channel block, PBCH block) is used as an example. The network device first sends the SSB to the terminal device, and the terminal device identifies a cell and performs synchronization with the cell based on the SSB. The terminal device accesses the cell under the premise that the terminal device successfully receives the synchronization signal block. Because the synchronization signal block is a downlink signal sent by the network device to the terminal device, if the SSB is transmitted in a slot, a symbol occupied by the SSB should be D. Currently, there are several SSB transmission cases as follows. Each SSB transmission occupies four symbols.

Case A: An SSB is transmitted by using the slot format corresponding to the 15 kHz subcarrier spacing, and an index corresponding to a start symbol of the SS/PBCH block is {2, 8}+14*n. If a frequency domain of a carrier is less than or equal to 3 GHz, n=0, 1; if a frequency domain of a carrier is less than or equal to 6 GHz, n=0, 1, 2, 3. An index of a symbol may be understood as a number of the symbol. For example, for the slot format of the NCP, numbers of the 14 symbols are 0 to 13, and for the slot format of the ECP, numbers of the 12 symbols are 0 to 11.

Case B: An SSB is transmitted by using the slot format corresponding to the 30 kHz subcarrier spacing, and an index corresponding to a start symbol of the SS/PBCH block is {4, 8, 16, 20}+28*n. If a frequency domain of a carrier is less than or equal to 3 GHz, n=0; if a frequency domain of a carrier is less than or equal to 6 GHz, n=0, 1.

Case C: An SSB is transmitted by using the slot format corresponding to the 30 kHz subcarrier spacing, and an index corresponding to a start symbol of the SS/PBCH block is {2, 8}+14*n. For a symmetric spectrum (an FDD system), if a frequency domain of a carrier is less than or equal to 3 GHz, n=0, 1; if a frequency domain of a carrier is greater than 3 GHz and less than or equal to 6 GHz, n=0, 1, 2, 3. For an asymmetric spectrum (a TDD system), if GHz is less than or equal to 2.4 GHz, n=0, 1; if GHz is greater than 2.4 GHz and less than or equal to 6 GHz, n=0, 1, 2, 3.

According to a mapping relationship between an NCP corresponding to the 60 kHz subcarrier spacing and a slot format of an NCP corresponding to the 30 kHz subcarrier spacing, and a mapping relationship between the slot format of the NCP corresponding to the 60 kHz subcarrier spacing and a slot format of an ECP corresponding to the 60 kHz subcarrier spacing, symbol locations at which the SSB corresponding to Case C is mapped to the NCP and the ECP corresponding to the 60 kHz subcarrier spacing may be determined. FIG. 1 shows symbol locations at which an SSB corresponding to Case C is mapped to an NCP and an ECP corresponding to a 60 kHz subcarrier spacing.

It can be learned from definitions in the NR system that, because signals carrying same information have different propagation paths, when a latency difference between moments when the signals arrive at a receive side is greater than a time length corresponding to a cyclic prefix (cyclic prefix, CP), interference on different symbols occurs. The inter-symbol interference greatly reduces a signal reception success rate. Therefore, this problem needs to be avoided in the NR system. Currently, it is found in research that a maximum latency difference (about 2.4 μs-2.6 μs) in a factory environment is relatively large. Table 3 shows CP lengths that correspond to different subcarriers and that are defined in the NR system. It can be learned from Table 3 that the maximum latency difference in the factory environment is already greater than a CP length of the slot format of the NCP corresponding to the 30 kHz/60 kHz subcarrier spacing. That is, a manner in which the slot format of the NCP at the 30 kHz/60 kHz subcarrier spacing is used for transmission in an existing system cannot be used. Correspondingly, only an NCP corresponding to the 15 kHz subcarrier spacing or a slot format of an ECP corresponding to the 60 kHz subcarrier spacing can be used for data transmission. Because a time domain length occupied by each symbol in the slot format of the NCP corresponding to the 15 kHz subcarrier spacing is excessively long, a time domain length occupied by each transmission is excessively long. Consequently, the NCP corresponding to the 15 kHz subcarrier spacing is not applicable to a latency-sensitive service such as URLLC. In this way, an only option is to use the slot format of the ECP corresponding to the 60 kHz subcarrier spacing for data transmission.

TABLE 3

| Subcarrier spacing | ECP length (μs) | NCP length 1 (corresponding to a symbol index 0/7) (μs) | NCP length 2 (corresponding to symbol indexes 0 to 13 except 0/7) (μs) |
|---|---|---|---|
| 15 kHz | — | 5.2083333 | 4.6875 |
| 30 kHz | — | 2.8645833 | 2.34375 |
| 60 kHz | 4.16666667 | 1.6927083 | 1.171875 |

When the slot format of the ECP corresponding to the 60 kHz subcarrier spacing is used for data transmission, normal transmission of an SSB first needs to be ensured. It can be learned from FIG. 1 that for SSB transmission performed by using the slot format of the ECP corresponding to the 60 kHz subcarrier spacing, there are two different transmission formats (transmission patterns). In the first transmission format, all symbols 3 to 10 in the first slot need to be downlink symbols. In the second transmission format, all symbols 1 to 8 in the second slot need to be downlink symbols. With reference to the slot format of the ECP corresponding to the 60 kHz subcarrier spacing shown in Table 2, the usable slot formats in Table 2 include:

a slot format corresponding to the first transmission format includes: DDD"DDDDDDDD"F, corresponding to the format index 4; and slot formats corresponding to the second transmission format include:

DDDDDDDDDDDDD, corresponding to the format index 0/3;

DDDDDDDDDDDDF, corresponding to the format index 4;

DDDDDDDDDDDFF, corresponding to the format index 5;

DDDDDDDDDDFFF, corresponding to the format index 6;

DDDDDDDDDDDDU, corresponding to the format index 28, which cannot be used;

DDDDDDDDDDDFU, corresponding to the format index 29;

DDDDDDDDDDFFU, corresponding to the format index 30;

DDDDDDDDDDDUU, corresponding to the format index 31, which cannot be used; and

DDDDDDDDDDFUU, corresponding to the format index 32.

It can be learned that basically all existing usable slot formats in Table 2 are D, in other words, the existing slot formats are only applicable to transmitting downlink data on the basis of meeting SSB transmission. However, in a factory scenario, an uplink and a downlink URLLC service coexist. In this case, the existing slot formats are not applicable to transmitting uplink data. Consequently, transmission of the uplink data in the URLLC service is seriously affected, normal running of the URLLC service is affected, and communication efficiency is reduced.

In view of this, this application provides a slot format indication method and a communication apparatus. Therefore, a slot format can support transmission of a downlink signal and uplink data, so that transmission of uplink data in a URLLC service is ensured, and normal running of the URLLC service is ensured.

For ease of understanding the embodiments of this application, a communication system to which the embodiments of this application are applicable is first briefly described with reference to FIG. 2.

Figure 2:
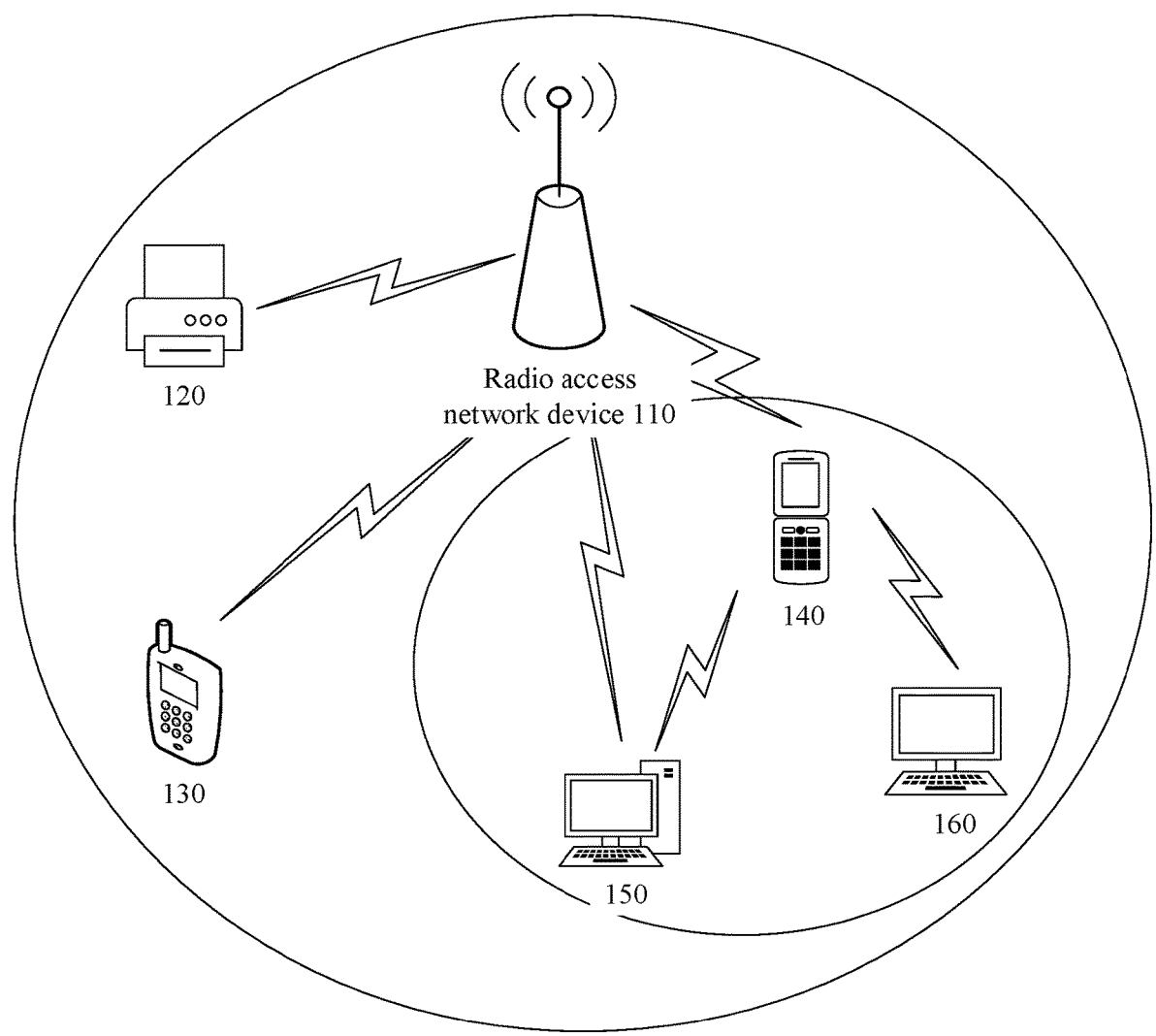
FIG. 2 is a schematic architectural diagram of a mobile communication system to which an embodiment of this application is applicable.

FIG. 2 is a schematic diagram of a communication system to which an embodiment of this application is applicable. As shown in FIG. 2, the mobile communication system 100 may include at least one radio access network device 110 and at least one terminal device (terminal devices 120, 130, 140, 150, and 160 shown in FIG. 2). The terminal device is connected to the radio access network device in a wireless manner, and the radio access network device may be the foregoing network device. The at least one terminal device may send uplink data or information to the radio access network device, or the radio access network device 110 may send downlink data or information to the at least one terminal device. In addition, a plurality of terminal devices may form a communication system. For example, the terminal devices 140, 150, and 160 may form a communication system. The terminal device 140 may also send downlink data or information to the terminal devices 150 and 160, and the terminal devices 150 and 160 may also send uplink data or information to the terminal device 140. Uplink and downlink data and information related to a URLLC service may be transmitted between the terminal device and the radio access network device.

Figure 3:
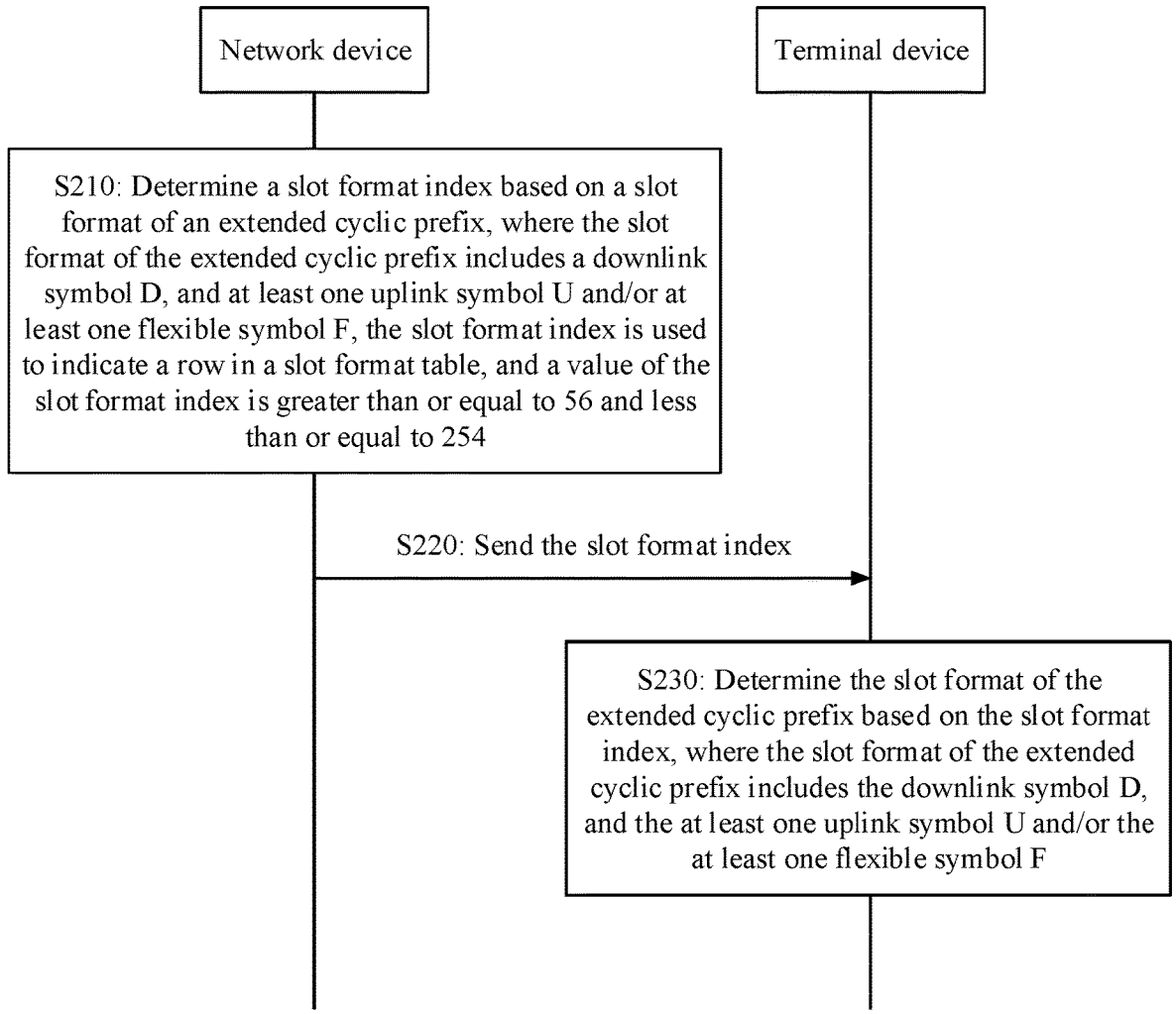
FIG. 3 is a schematic interaction diagram of a slot format indication method according to an embodiment of this application.

It should be understood that, FIG. 2 is only a schematic diagram, and the communication system may further include another network device and/or another terminal device that are/is not shown in FIG. 3. Quantities of radio access network devices and terminals included in the mobile communication system are not limited in the embodiments of this application. In the mobile communication system 100, the radio access network device 110 may be the foregoing network device.

The following describes in detail a time domain resource boundary adjustment method provided in this application with reference to FIG. 3. FIG. 3 is a schematic flowchart of a slot format indication method 200 according to an embodiment of this application. The method 200 may be applied to the scenario shown in FIG. 2, for example, may be applied to scenarios that have a relatively high requirement on a data packet transmission latency such as an engineering automation scenario and a process control scenario. This is not limited in this embodiment of this application.

It should be understood that, in the following descriptions, an example in which the method in the embodiments is performed by a terminal device and a network device is used to describe the method in the embodiments. As an example instead of a limitation, the method may alternatively be performed by a chip used in the terminal device and a chip used in the network device.

As shown in FIG. 3, the method 200 shown in FIG. 3 may include step S210 and step S220. The following describes the steps in the method 200 in detail with reference to FIG. 3. The method 200 includes the following steps.

S210: A network device determines a slot format index based on a slot format of an extended cyclic prefix, where the slot format of the extended cyclic prefix includes a downlink symbol D, and at least one uplink symbol U and/or at least one flexible symbol F, the slot format index is used to indicate a row in a slot format table, the row in the slot format table is used to indicate symbol attributes respectively corresponding to at least 12 symbols, the symbol attribute includes a location of an uplink symbol U, a downlink symbol D, or a flexible symbol F, and optionally, a value of the slot format index is greater than or equal to 56 and less than or equal to 254.

S220: The network device sends the slot format index to a terminal device. Correspondingly, the terminal device receives the slot format index.

S230: The terminal device determines the slot format of the extended cyclic prefix based on the slot format index, where the slot format of the extended cyclic prefix includes the downlink symbol D, and the at least one uplink symbol U and/or the at least one flexible symbol F.

Specifically, in S210, when data transmission is performed between the network device and the terminal device, the network device may notify the terminal device of the slot format index used for data transmission. Specifically, it can be learned from the foregoing descriptions that, to meet a transmission latency requirement of a URLLC service, the slot format of the extended cyclic prefix needs to be used to perform uplink and downlink data transmission. Therefore, the network device determines the slot format index based on the slot format of the extended cyclic prefix. A subcarrier spacing corresponding to the slot format of the extended cyclic prefix may be any one of a 30 kHz subcarrier spacing, a 60 kHz subcarrier spacing, a 120 kHz subcarrier spacing, and a 240 kHz subcarrier spacing. In addition, the slot format of the extended cyclic prefix includes the downlink symbol D, and the at least one uplink symbol U and/or the at least one flexible symbol F. In other words, the slot format of the extended cyclic prefix needs to be applicable to uplink transmission and downlink transmission, and needs to meet a transmission latency of the URLLC service. For example, the slot format of the extended cyclic prefix may be a slot format of an ECP corresponding to the 60 kHz subcarrier spacing. In addition, the slot format of the extended cyclic prefix further needs to meet a requirement that an SSB can be transmitted. For example, when the SSB is transmitted by using the slot format of the ECP corresponding to the 60 kHz subcarrier spacing, the foregoing two transmission formats need to be met, that is, symbol locations occupied by the SSB need to be downlink symbols.

The slot format index is used to indicate the row in the slot format table. A form of the slot format table may be similar to a form of Table 1 or Table 2. The slot format index is equivalent to the format (format) in the first column in Table 1 or Table 2. The value of the slot format index is equivalent to a value of the format (format) in the first column in Table 1 or Table 2. Optionally, in this embodiment of this application, the value of the slot format index is greater than or equal to 56 and less than or equal to 254. That is, the reserved value of the slot format index may be used to indicate the slot format. It should be understood that, in this embodiment of this application, the value of the slot format index may alternatively be less than 56. Alternatively, the value of the slot format index may be greater than 254. A slot format indicated by the slot format table may be a slot with an extended cyclic prefix, or may be a slot with a normal cyclic prefix.

The slot format table is used to indicate symbol attributes of 12 or 14 symbols included in a slot. The symbol attribute may be understood as an attribute indicating that a symbol is an uplink symbol U, a downlink symbol D, or a flexible symbol F. The slot format table may be preconfigured or predefined. The slot format indicated by the slot format table may be the slot format (14 symbols) of the normal cyclic prefix or the slot format (14 symbols) of the extended cyclic prefix. A subcarrier spacing corresponding to the slot format indicated by the slot format table may also be any one of subcarrier spacings such as a 15 kHz subcarrier spacing, the 30 kHz subcarrier spacing, the 60 kHz subcarrier spacing, the 120 kHz subcarrier spacing, and the 240 kHz subcarrier spacing. Optionally, a subcarrier spacing corresponding to a slot format indicated by the slot format index is less than or equal to the subcarrier spacing corresponding to the slot format of the extended cyclic prefix.

In S220, the network device sends the slot format index to the terminal device. Correspondingly, the terminal device receives the slot format index. For example, the network device may send the slot format index to the terminal device by using higher layer signaling or physical layer signaling.

In S230, the terminal device may determine, based on the slot format index, symbol attributes of 12 or 14 symbols in a row in the slot table indicated by the slot format index, and may determine the slot format of the extended cyclic prefix based on the symbol attributes of the 12 or 14 symbols. The extended cyclic slot format is applicable to uplink transmission and downlink transmission, and needs to meet the transmission latency requirement of the URLLC service. In addition, the slot format of the extended cyclic prefix includes the downlink symbol D, and the at least one uplink symbol U and/or the at least one flexible symbol F.

According to the slot format indication method provided in this application, the network device sends the slot format index to the terminal device, where the slot format index is used by the terminal device to determine the slot format of the extended cyclic prefix, and the slot format of the extended cyclic prefix includes the downlink symbol D, and the at least one uplink symbol U and/or the at least one flexible symbol F. The slot format of the extended cyclic prefix can meet uplink transmission, downlink transmission, and the transmission latency requirement of the URLLC service, and normal transmission of the SSB can be ensured. In this way, normal transmission of the URLLC service is ensured.

In S220, the network device sends the slot format index to the terminal device. Specifically, the network device determines a first bit quantity based on a largest slot format index in the slot format table. The largest slot format index in the slot format table may be understood as a largest value of the slot format index in the slot format table. The network device sends a first bit status value corresponding to the first bit quantity to the terminal device, where the first bit status value is used to indicate the slot format index. For example, if the largest value of the slot format index in the slot format table is 128, the first bit quantity is 7 bits. A bit state of each bit may be 0 or 1. In this case, there are 128 bit status values corresponding to the first bit quantity. The first bit status value is one of the 128 bit status values, and the first bit status value is used to indicate a value of a slot format index. After receiving the first bit status value, the terminal device may determine, based on the first bit status value, the slot format index indicated by the first bit status value. Optionally, the first bit quantity may be calculated according to formula (1):

$$M=\max\{\lceil \text{Log}_2(\max \text{SFIindex}+1)\rceil,1\} \quad (1)$$

In formula (1), M represents the first bit quantity, SFIindex represents the largest slot format index in the slot format table, and $\lceil\ \rceil$ represents rounding up.

In this embodiment of this application, in a possible implementation, the slot format index sent by the network device to the terminal device includes at least one of slot format indexes used to indicate the following two types of symbol attributes:

a first type of symbol attributes $Y_0 Y_1 Y_2 Z_0 \text{DDDDDDDD} Y_3 Y_4$, where D represents a downlink symbol, $Y_0$ to $Y_3$ each represent any one of a flexible symbol, an uplink symbol, and a downlink symbol, $Z_0$ represents a flexible symbol or a downlink symbol, and $Y_4$ represents a flexible symbol or an uplink symbol; and a second type of symbol attributes $X_0 X_1 \text{DDDDDDDD} X_2 X_3 X_4 X_5$, where D represents a downlink symbol, $X_0$ and $X_1$ each represent a flexible symbol or an uplink symbol, $X_2$ represents a flexible symbol or a downlink symbol, $X_3$ represents a flexible symbol or an uplink symbol, and $X_4$ and $X_5$ each represent any one of a flexible symbol, an uplink symbol, and a downlink symbol.

Specifically, when the slot table corresponding to the slot format index sent by the network device to the terminal device is a normal cyclic prefix format table corresponding to the 60 kHz subcarrier spacing, and the slot format of the extended cyclic prefix finally used by the terminal device to perform uplink and downlink data transmission is the extended cyclic prefix format corresponding to the 60 kHz subcarrier spacing, because the slot format of the extended cyclic prefix further needs to ensure SSB transmission, the slot format of the extended cyclic prefix needs to meet the slot formats shown in FIG. 2, to be specific, the extended cyclic prefix format at 60 kHz needs to meet the following requirements: In a first transmission format (or referred to as the first type of symbol attributes), all symbols 3 to 10 in a slot need to be downlink symbols, which is equivalent to the slot format in the first slot in the extended cyclic prefix format at 60 kHz in FIG. 2. In a second transmission format (or referred to as the second type of symbol attributes), all symbols 1 to 8 in a slot need to be downlink symbols, which is equivalent to the slot format in the second slot in the extended cyclic prefix format at 60 kHz in FIG. 2. Because the slot table corresponding to the slot format index is the normal cyclic prefix format table corresponding to the 60 kHz subcarrier spacing, the terminal device may determine the extended cyclic prefix format at 60 kHz based on a normal cyclic prefix format at 60 kHz and the foregoing mapping relationship between the slot format of the extended cyclic prefix and the slot format of the normal cyclic prefix. In addition, the determined extended cyclic prefix format at 60 kHz needs to meet the following requirements: In the first transmission format, all symbols 3 to 10 need to be downlink symbols, and in the second transmission format, all symbols 1 to 8 need to be downlink symbols. In addition, there is an uplink symbol U and/or a flexible symbol F included in another symbol location.

Therefore, when the slot table corresponding to the slot format index is the normal cyclic prefix format corresponding to the 60 kHz subcarrier spacing, the slot format index includes at least one of two types of symbol attributes used to indicate the normal cyclic prefix format corresponding to the 60 kHz subcarrier spacing:

a first type of symbol attributes $Y_0 Y_1 Y_2 Z_0 \text{DDDDDDDD} Y_3 Y_4$, where D represents a downlink symbol, $Y_0$ to $Y_3$ each represent any one of a flexible symbol, an uplink symbol, and a downlink symbol, $Z_0$ represents a flexible symbol or a downlink symbol, and $Y_4$ represents a flexible symbol or an uplink symbol; and a second type of symbol attributes $X_0 X_1 \text{DDDDDDDD} X_2 X_3 X_4 X_5$, where D represents a downlink symbol, $X_0$ and $X_1$ each represent a flexible symbol or an uplink symbol, $X_2$ represents a flexible symbol or a downlink symbol, $X_3$ represents a flexible symbol or an uplink symbol, and $X_4$ and $X_5$ each represent any one of a flexible symbol, an uplink symbol, and a downlink symbol.

Both the first type of symbol attributes and the second type of symbol attributes correspond to the slot format of the normal cyclic prefix corresponding to the 60 kHz subcarrier spacing.

Specifically, for the first type of symbol attributes, in a possible implementation, possible values of the slot format index and symbol attributes of 14 symbols indicated by each possible value may be shown in Table 4.

TABLE 4

| Slot format (format) index | Symbol indexes in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | D | F | F | $Z_0$ | D | D | D | D | D | D | D | D | $Y_3$ | $Y_4$ |
| 57 | D | F | U | $Z_0$ | D | D | D | D | D | D | D | D | $Y_3$ | $Y_4$ |
| 58 | F | D | D | D | D | D | D | D | D | D | D | D | $Y_3$ | $Y_4$ |
| 59 | F | F | D | D | D | D | D | D | D | D | D | D | $Y_3$ | $Y_4$ |
| 60 | F | F | F | $Z_0$ | D | D | D | D | D | D | D | D | $Y_3$ | $Y_4$ |
| 61 | F | F | U | $Z_0$ | D | D | D | D | D | D | D | D | $Y_3$ | $Y_4$ |
| 62 | F | U | D | D | D | D | D | D | D | D | D | D | $Y_3$ | $Y_4$ |
| 63 | F | U | F | $Z_0$ | D | D | D | D | D | D | D | D | $Y_3$ | $Y_4$ |
| 64 | F | U | U | $Z_0$ | D | D | D | D | D | D | D | D | $Y_3$ | $Y_4$ |
| 65 | U | D | D | D | D | D | D | D | D | D | D | D | $Y_3$ | $Y_4$ |
| 66 | U | F | D | D | D | D | D | D | D | D | D | D | $Y_3$ | $Y_4$ |
| 67 | U | F | F | $Z_0$ | D | D | D | D | D | D | D | D | $Y_3$ | $Y_4$ |
| 68 | U | U | D | D | D | D | D | D | D | D | D | D | $Y_3$ | $Y_4$ |
| 69 | U | U | F | $Z_0$ | D | D | D | D | D | D | D | D | $Y_3$ | $Y_4$ |
| 70 | U | U | U | $Z_0$ | D | D | D | D | D | D | D | D | $Y_3$ | $Y_4$ |

In the slot table shown in Table 4, D represents a downlink symbol, $Z_0$ represents a flexible symbol or a downlink symbol, $Y_3$ represents any one of a flexible symbol, an uplink symbol, and a downlink symbol, and $Y_4$ represents a flexible symbol or an uplink symbol. However, when $Y_3$ represents D, $Y_4$ cannot represent U.

It should be understood that Table 4 is merely an example, and the value of the slot format index and the symbol attributes of the 14 symbols corresponding to the slot format index should not be limited. For example, the value of the slot format index in Table 4 may alternatively be another value, for example, 71 to 85.

When receiving any slot format index shown in Table 4, the terminal device may determine a normal cyclic prefix format at 60 kHz based on the slot format index. After determining the normal cyclic prefix format at 60 kHz, the terminal device determines a slot format of an extended cyclic prefix at 60 kHz based on a mapping relationship between the normal cyclic prefix format at 60 kHz and the slot format of the extended cyclic prefix at 60 kHz. The slot format of the extended cyclic prefix at 60 kHz includes a downlink symbol D, at least one uplink symbol U, and at least one flexible symbol F, so that transmission of a URLLC uplink service and a URLLC downlink service is ensured. In addition, the slot format of the extended cyclic prefix at 60 kHz may further meet the requirement in the first transmission format, that is, may ensure SSB transmission, so that communication quality is ensured.

For the second type of symbol attributes $X_0$ $X_1$ DDDDDDDD$X_2$ $X_3$ $X_4$ $X_5$, D represents a downlink symbol, $X_0$ and $X_1$ each represent a flexible symbol or an uplink symbol, $X_2$ represents a flexible symbol or a downlink symbol, $X_3$ represents a flexible symbol or an uplink symbol, and $X_4$ and $X_5$ each represent any one of a flexible symbol, an uplink symbol, and a downlink symbol. In a possible implementation, for the second type of symbol attributes, possible values of the slot format index and symbol attributes of 14 symbols indicated by each possible value may be shown in Table 5.

TABLE 5

| Slot format (format) index | Symbol indexes in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | $X_0$ | $X_1$ | D | D | D | D | D | D | D | D | $X_2$ | F | D | D |
| 57 | $X_0$ | $X_1$ | D | D | D | D | D | D | D | D | $X_2$ | F | F | F |
| 58 | $X_0$ | $X_1$ | D | D | D | D | D | D | D | D | $X_2$ | F | F | F |
| 59 | $X_0$ | $X_1$ | D | D | D | D | D | D | D | D | $X_2$ | F | F | U |
| 60 | $X_0$ | $X_1$ | D | D | D | D | D | D | D | D | $X_2$ | F | U | D |
| 61 | $X_0$ | $X_1$ | D | D | D | D | D | D | D | D | $X_2$ | F | U | F |
| 62 | $X_0$ | $X_1$ | D | D | D | D | D | D | D | D | $X_2$ | F | U | U |
| 63 | $X_0$ | $X_1$ | D | D | D | D | D | D | D | D | F | U | D | D |
| 64 | $X_0$ | $X_1$ | D | D | D | D | D | D | D | D | F | U | D | F |
| 65 | $X_0$ | $X_1$ | D | D | D | D | D | D | D | D | F | U | F | D |
| 66 | $X_0$ | $X_1$ | D | D | D | D | D | D | D | D | F | U | F | F |
| 67 | $X_0$ | $X_1$ | D | D | D | D | D | D | D | D | F | U | U | D |
| 68 | $X_0$ | $X_1$ | D | D | D | D | D | D | D | D | F | U | U | F |
| 69 | $X_0$ | $X_1$ | D | D | D | D | D | D | D | D | F | U | U | U |

In the slot table shown in Table 5, $X_0$ and $X_1$ each represent a flexible symbol or an uplink symbol, and $X_2$ represents a flexible symbol or a downlink symbol.

It should be understood that Table 5 is merely an example, and the value of the slot format index and the symbol attributes of the 14 symbols corresponding to the slot format index should not be limited. For example, the value of the slot format index in Table 4 may alternatively be another value.

When receiving any slot format index shown in Table 5, the terminal device may determine a corresponding normal cyclic prefix format at 60 kHz based on the slot format index. After determining the normal cyclic prefix format at 60 kHz, the terminal device determines a slot format of an extended cyclic prefix at 60 kHz based on a mapping relationship or correspondence between the normal cyclic prefix format at 60 kHz and the slot format of the extended cyclic prefix at 60 kHz. In addition, the slot format of the extended cyclic prefix at 60 kHz may further meet the requirement in the second transmission format, that is, may ensure SSB transmission.

The symbol attributes corresponding to the normal cyclic prefix format corresponding to the 60 kHz subcarrier spacing are indicated to the terminal device, so that the terminal device determines the slot format of the extended cyclic prefix at 60 kHz by using only the mapping relationship between the normal cyclic prefix format at 60 kHz and the slot format of the extended cyclic prefix at 60 kHz, and the terminal device can more accurately determine the extended cyclic prefix format at 60 kHz. In this way, complexity of determining the extended cyclic prefix format at 60 kHz by the terminal device is reduced, and the solution is easy to implement.

In this embodiment of this application, in another possible implementation, the symbol attributes indicated by the slot format index sent by the network device to the terminal device are $Z_0\ Z_1$ DDDD $Z_2 Z_3$ DDDD $Z_4 Z_5$, where $Z_0$ to $Z_5$ each represent a flexible symbol or an uplink symbol, and D represents a downlink symbol.

Specifically, when a slot table corresponding to the slot format index sent by the network device to the terminal device is a normal cyclic prefix slot format table corresponding to the 30 kHz subcarrier spacing, and the terminal device performs uplink and downlink data transmission by finally using the extended cyclic prefix format at 60 kHz, because the slot format of the extended cyclic prefix needs to ensure SSB transmission, the slot format of the extended cyclic prefix needs to meet the slot formats shown in FIG. 2.

According to the correspondence between the slot format of the normal cyclic prefix at 30 kHz and the slot format of the extended cyclic prefix at 60 kHz shown in FIG. 2, it can be learned that, to ensure that the slot format of the extended cyclic prefix can meet SSB transmission, symbols 2 to 5 need to be downlink symbols, and symbols 8 to 11 need to be downlink symbols in the slot format of the normal cyclic prefix at 30 kHz.

Therefore, when the slot table corresponding to the slot format index is the normal cyclic prefix format corresponding to the 30 kHz subcarrier spacing, and the slot format of the extended cyclic prefix is the extended cyclic prefix format corresponding to the 60 kHz subcarrier spacing, symbol attributes of the normal cyclic prefix format at 30 kHz that are indicated by the slot format index are $Z_0\ Z_1$ DDDD $Z_2 Z_3$ DDDD $Z_4 Z_5$, where $Z_0$ to $Z_5$ each represent a flexible symbol or an uplink symbol, and D represents a downlink symbol.

The terminal device may determine the extended cyclic prefix format at 60 kHz based on the normal cyclic prefix format at 30 kHz and the foregoing mapping relationship or correspondence between the slot format of the extended cyclic prefix and the slot format of the normal cyclic prefix. In addition, the determined extended cyclic prefix format at 60 kHz needs to meet the following requirements: In the first transmission format, all symbols 3 to 10 need to be downlink symbols, and in the second transmission format, all symbols 1 to 8 need to be downlink symbols. In addition, there is an uplink symbol U and/or a flexible symbol F included in another symbol location.

For the foregoing symbol attributes of the normal cyclic prefix format at 30 kHz, in a possible implementation, possible values of the slot format index and symbol attributes of 14 symbols indicated by each possible value may be shown in Table 6.

TABLE 6

| Slot format | Symbol indexes in a slot | | | | | | | | | | | | | |
|---|---|---|---|---|---|---|---|---|---|---|---|---|---|---|
| (format) index | 0 | 1 | 2 | 3 | 4 | 5 | 6 | 7 | 8 | 9 | 10 | 11 | 12 | 13 |
| 56 | U | U | D | D | D | D | F | U | D | D | D | D | F | U |
| 57 | U | U | D | D | D | D | F | U | D | D | D | D | F | F |
| 58 | U | U | D | D | D | D | F | F | D | D | D | D | F | U |
| 59 | U | U | D | D | D | D | F | F | D | D | D | D | F | F |
| 60 | F | U | D | D | D | D | F | U | D | D | D | D | F | U |
| 61 | F | U | D | D | D | D | F | U | D | D | D | D | F | F |
| 62 | F | U | D | D | D | D | F | F | D | D | D | D | F | U |
| 63 | F | U | D | D | D | D | F | F | D | D | D | D | F | F |
| 64 | U | F | D | D | D | D | F | U | D | D | D | D | F | U |
| 65 | U | F | D | D | D | D | F | U | D | D | D | D | F | F |
| 66 | U | F | D | D | D | D | F | F | D | D | D | D | F | U |
| 67 | U | F | D | D | D | D | F | F | D | D | D | D | F | F |
| 68 | F | F | D | D | D | D | F | U | D | D | D | D | F | U |
| 69 | F | F | D | D | D | D | F | U | D | D | D | D | F | F |
| 70 | F | F | D | D | D | D | F | F | D | D | D | D | F | U |
| 71 | F | F | D | D | D | D | F | F | D | D | D | D | U | F |
| 72 | U | U | D | D | D | D | F | U | D | D | D | D | U | U |
| 73 | U | U | D | D | D | D | F | U | D | D | D | D | U | F |
| 74 | U | U | D | D | D | D | F | F | D | D | D | D | U | U |
| 75 | U | U | D | D | D | D | F | F | D | D | D | D | U | F |
| 76 | F | U | D | D | D | D | F | U | D | D | D | D | U | U |
| 77 | F | U | D | D | D | D | F | U | D | D | D | D | U | F |
| 78 | F | U | D | D | D | D | F | F | D | D | D | D | U | U |
| 79 | F | U | D | D | D | D | F | F | D | D | D | D | U | F |
| 80 | U | F | D | D | D | D | F | U | D | D | D | D | U | U |
| 81 | U | F | D | D | D | D | F | U | D | D | D | D | U | F |
| 82 | U | F | D | D | D | D | F | F | D | D | D | D | U | U |
| 83 | U | F | D | D | D | D | F | F | D | D | D | D | U | F |
| 84 | F | F | D | D | D | D | F | U | D | D | D | D | U | U |
| 85 | F | F | D | D | D | D | F | U | D | D | D | D | U | F |
| 86 | F | F | D | D | D | D | F | F | D | D | D | D | U | U |
| 87 | F | F | D | D | D | D | F | F | D | D | D | D | U | F |

TABLE 6-continued

| Slot format (format) index | Symbol indexes in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 88 | U | U | D | D | D | D | U | U | D | D | D | D | F | U |
| 89 | U | U | D | D | D | D | U | U | D | D | D | D | F | F |
| 90 | U | U | D | D | D | D | U | F | D | D | D | D | F | U |
| 91 | U | U | D | D | D | D | U | F | D | D | D | D | F | F |
| 92 | F | U | D | D | D | D | U | U | D | D | D | D | F | U |
| 93 | F | U | D | D | D | D | U | U | D | D | D | D | F | F |
| 94 | F | U | D | D | D | D | U | F | D | D | D | D | F | U |
| 95 | F | U | D | D | D | D | U | F | D | D | D | D | F | F |
| 96 | U | F | D | D | D | D | U | U | D | D | D | D | F | U |
| 97 | U | F | D | D | D | D | U | U | D | D | D | D | F | F |
| 98 | U | F | D | D | D | D | U | F | D | D | D | D | F | U |
| 99 | U | F | D | D | D | D | U | F | D | D | D | D | F | F |
| 100 | F | F | D | D | D | D | U | U | D | D | D | D | F | U |
| 101 | F | F | D | D | D | D | U | U | D | D | D | D | F | F |
| 102 | F | F | D | D | D | D | U | F | D | D | D | D | F | U |
| 103 | F | F | D | D | D | D | U | F | D | D | D | D | F | F |
| 104 | U | U | D | D | D | D | U | U | D | D | D | D | U | U |
| 105 | U | U | D | D | D | D | U | U | D | D | D | D | U | F |
| 106 | U | U | D | D | D | D | U | F | D | D | D | D | U | U |
| 107 | U | U | D | D | D | D | U | F | D | D | D | D | U | F |
| 108 | F | U | D | D | D | D | U | U | D | D | D | D | U | U |
| 109 | F | U | D | D | D | D | U | U | D | D | D | D | U | F |
| 110 | F | U | D | D | D | D | U | F | D | D | D | D | U | U |
| 111 | F | U | D | D | D | D | U | F | D | D | D | D | U | F |
| 112 | U | F | D | D | D | D | U | U | D | D | D | D | U | U |
| 113 | U | F | D | D | D | D | U | U | D | D | D | D | U | F |
| 114 | U | F | D | D | D | D | U | F | D | D | D | D | U | U |
| 115 | U | F | D | D | D | D | U | F | D | D | D | D | U | F |
| 116 | F | F | D | D | D | D | U | U | D | D | D | D | U | U |
| 117 | F | F | D | D | D | D | U | U | D | D | D | D | U | F |
| 118 | F | F | D | D | D | D | U | F | D | D | D | D | U | U |
| 119 | F | F | D | D | D | D | U | F | D | D | D | D | U | F |

It should be understood that Table 6 is merely an example, and the value of the slot format index and the symbol attributes of the 14 symbols corresponding to the slot format index should not be limited. For example, the value of the slot format index in Table 6 may alternatively be another value.

When receiving any slot format index shown in Table 6, the terminal device may determine a slot format of a normal cyclic prefix at 30 kHz based on the slot format index. After determining the slot format of the normal cyclic prefix at 30 kHz, the terminal device determines a slot format of a normal cyclic prefix at 60 kHz based on a mapping relationship between the normal cyclic prefix slot format at 30 kHz and the normal cyclic prefix slot format at 60 kHz, and then determines an extended cyclic prefix format at 60 kHz based on a mapping relationship between the slot format of the normal cyclic prefix at 60 kHz and the slot format of the extended cyclic prefix at 60 kHz. In addition, the determined extended cyclic prefix format at 60 kHz needs to meet SSB transmission. Furthermore, there is an uplink symbol U and/or a flexible symbol F included in another symbol location. In other words, uplink transmission, downlink transmission, and a transmission latency requirement of a URLLC service can be further met.

The symbol attributes corresponding to the normal cyclic prefix format corresponding to the 30 kHz subcarrier spacing are indicated to the terminal device, so that the terminal device can more accurately determine the extended cyclic prefix format at 60 kHz. Further, because symbol attributes of only 14 symbols need to be notified, resources occupied by notification of the symbol attributes can be reduced, and resource utilization is improved.

In this embodiment of this application, in another possible implementation, the symbol attributes indicated by the slot format index sent by the network device to the terminal device are $Z_0$ DD FDD F $Z_1$ DD $Z_2$DD $Z_3$, where F represents a flexible symbol, $Z_1$ to $Z_3$ each represent a flexible symbol or an uplink symbol, and D represents a downlink symbol.

Specifically, when a slot table corresponding to the slot format index sent by the network device to the terminal device is a normal cyclic prefix slot format table corresponding to the 15 kHz subcarrier spacing, and the terminal device performs uplink and downlink data transmission by finally using the extended cyclic prefix format at 60 kHz, because the slot format of the extended cyclic prefix needs to ensure SSB transmission, the slot format of the extended cyclic prefix needs to meet the slot formats shown in FIG. 2. According to the correspondence between the slot format of the normal cyclic prefix at 15 kHz and the slot format of the extended cyclic prefix at 60 kHz shown in FIG. 2, it can be learned that to ensure that the slot format of the extended cyclic prefix can meet SSB transmission, both a symbol 1 and a symbol 2 need to be downlink symbols, both a symbol 4 and a symbol 5 need to be downlink symbols, both a symbol 8 and a symbol 9 need to be downlink symbols, and both a symbol 11 and a symbol 12 need to be downlink symbols in the slot format of the normal cyclic prefix at 15 kHz.

Therefore, when the slot table corresponding to the slot format index is the normal cyclic prefix format corresponding to the 15 kHz subcarrier spacing, and a slot format of an extended cyclic prefix is the extended cyclic prefix format corresponding to the 60 kHz subcarrier spacing, symbol attributes of the normal cyclic prefix format at 15 kHz that are indicated by the slot format index are $Z_0$ DD FDD F $Z_1$ DD $Z_2$DD $Z_3$, where F represents a flexible symbol, $Z_0$ to $Z_3$ each represent a flexible symbol or an uplink symbol, and D represents a downlink symbol.

The terminal device determines the normal cyclic prefix format at 60 kHz based on the normal cyclic prefix format at 15 kHz and the foregoing mapping relationship between the slot formats of the normal cyclic prefix at different subcarrier spacings. Then, the terminal device determines the extended cyclic prefix format at 60 kHz based on the mapping relationship between the slot format of the normal cyclic prefix and the slot format of the extended cyclic prefix. In addition, the determined extended cyclic prefix format at 60 kHz needs to meet the following requirements: In the first transmission format, all symbols 3 to 10 need to be downlink symbols, and in the second transmission format, all symbols 1 to 8 need to be downlink symbols. In addition, there is an uplink symbol U and/or a flexible symbol F included in another symbol location.

For the foregoing symbol attributes of the normal cyclic prefix format at 15 kHz, in a possible implementation, possible values of the slot format index and symbol attributes of 14 symbols indicated by each possible value may be shown in Table 7.

TABLE 7

| Slot format (format) index | Symbol indexes in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | $Z_0$ | D | D | F | D | D | F | $Z_1$ | D | D | $Z_2$ | D | D | $Z_3$ |
| 57 | $Z_0$ | D | D | F | D | D | F | $Z_1$ | D | D | $Z_2$ | D | D | $Z_3$ |
| 58 | $Z_0$ | D | D | F | D | D | F | $Z_1$ | D | D | $Z_2$ | D | D | $Z_3$ |
| 59 | $Z_0$ | D | D | F | D | D | F | $Z_1$ | D | D | $Z_2$ | D | D | $Z_3$ |
| 60 | $Z_0$ | D | D | F | D | D | F | $Z_1$ | D | D | $Z_2$ | D | D | $Z_3$ |
| 61 | $Z_0$ | D | D | F | D | D | F | $Z_1$ | D | D | $Z_2$ | D | D | $Z_3$ |
| 62 | $Z_0$ | D | D | F | D | D | F | $Z_1$ | D | D | $Z_2$ | D | D | $Z_3$ |
| 63 | $Z_0$ | D | D | F | D | D | F | $Z_1$ | D | D | $Z_2$ | D | D | $Z_3$ |
| 64 | $Z_0$ | D | D | F | D | D | F | $Z_1$ | D | D | $Z_2$ | D | D | $Z_3$ |
| 65 | $Z_0$ | D | D | F | D | D | F | $Z_1$ | D | D | $Z_2$ | D | D | $Z_3$ |
| 66 | $Z_0$ | D | D | F | D | D | F | $Z_1$ | D | D | $Z_2$ | D | D | $Z_3$ |
| 67 | $Z_0$ | D | D | F | D | D | F | $Z_1$ | D | D | $Z_2$ | D | D | $Z_3$ |

In the slot table shown in Table 7, F represents a flexible symbol, $Z_0$ to $Z_3$ each represent a flexible symbol or an uplink symbol, and D represents a downlink symbol.

It should be understood that Table 7 is merely an example, and the value of the slot format index and the symbol attributes of the 14 symbols corresponding to the slot format index should not be limited. For example, the value of the slot format index in Table 7 may alternatively be another value.

When receiving any slot format index shown in Table 7, the terminal device may determine a corresponding slot format of a normal cyclic prefix at 15 kHz based on the slot format index. After determining the slot format of the normal cyclic prefix at 15 kHz, the terminal device determines a slot format of a normal cyclic prefix at 60 kHz based on a mapping relationship between the normal cyclic prefix slot format at 15 kHz and the normal cyclic prefix slot format at 60 kHz, and then determines an extended cyclic prefix format at 60 kHz based on a mapping relationship between the slot format of the normal cyclic prefix at 60 kHz and the slot format of the extended cyclic prefix at 60 kHz. In addition, the determined extended cyclic prefix format at 60 kHz needs to meet SSB transmission. Furthermore, there is an uplink symbol U and/or a flexible symbol F included in another symbol location. In other words, uplink transmission, downlink transmission, and a transmission latency requirement of a URLLC service can be further met.

The symbol attributes corresponding to the normal cyclic prefix format corresponding to the 15 kHz subcarrier spacing are indicated to the terminal device, so that the terminal device can more accurately determine the extended cyclic prefix format at 60 kHz. Further, because symbol attributes of only 14 symbols need to be notified, resources occupied by notification of the symbol attributes can be reduced, and resource utilization is improved.

In the foregoing several cases in which all slot tables corresponding to the slot format index sent by the network device to the terminal device are normal cyclic prefix format tables, that is, each row in the table has symbol attributes of 14 symbols, subcarrier spacings corresponding to these tables are 15 kHz, 30 kHz, and 60 kHz respectively. However, the terminal device transmits the uplink and downlink data and the SSB by finally using the extended cyclic prefix format corresponding to the 60 kHz subcarrier spacing. It can be learned that the symbol attributes of the 14 symbols indicated by the slot format index in these slot format tables include: D and U are two consecutive symbols, and a symbol index of the downlink symbol D is less than a symbol index of the uplink symbol U. That is, there may be no F between the symbol D and the symbol U, for example, the symbol 11 and the symbol 12 in the slot format table shown in Table 4, the symbol 11 and the symbol 12 corresponding to the slot format indexes 71 to 87 in the slot format table shown in Table 6, and the symbol 9 and the symbol 10 in the slot format table shown in Table 7. This is because the network device notifies the terminal device of the slot format index corresponding to the slot format of the normal cyclic prefix. After receiving the slot format index corresponding to the slot format of the normal cyclic prefix, the terminal device determines the slot format of the normal cyclic prefix indicated by the slot format index, and further determines, based on the mapping relationship between the slot format of the extended cyclic prefix and the slot format of the normal cyclic prefix, the slot format of the extended cyclic prefix finally used for transmission of the uplink and downlink data and the SSB. Even if the network device notifies the terminal device that there are adjacent D and U in the slot format, F may appear between D and U when mapping to the slot format of the extended cyclic prefix is finally performed. Therefore, in the normal cyclic prefix format table corresponding to the slot format index sent by the network device to the terminal device, there may be symbol attributes of two adjacent symbols D and U.

The symbol attributes of the 14 symbols indicated by using the slot format index include symbol attributes of D and U that are two consecutive symbols, where a symbol index of D is less than a symbol index of U, so that a quantity of slot format indexes used to indicate the symbol attributes of the 14 symbols may be increased, in other words, more types of symbol attributes of the 14 symbols may be used to indicate the extended cyclic prefix format. In this way, a more flexible indication of the symbol attributes of the 14 symbols is implemented. In addition, the extended cyclic prefix format at 60 kHz determined by the terminal device based on the symbol attributes of the 14 symbols indicated by the slot format index meets transmission of a URLLC uplink service and a URLLC downlink service, so that communication quality and efficiency are ensured.

In addition, in all the foregoing several possible implementations, the slot table corresponding to the slot format index sent by the network device to the terminal device is a normal cyclic prefix format table, that is, each row in the table has symbol attributes of 14 symbols. The terminal device may determine the extended cyclic prefix format at 60 kHz based on symbol attributes, of 14 symbols corresponding to a subcarrier spacing (for example, 15 kHz, 30 kHz, and 60 kHz), indicated by the slot index and the foregoing mapping relationship between the slot format of the extended cyclic prefix and the slot format of the normal cyclic prefix and/or between the slot formats of the normal cyclic prefix at different subcarrier spacings. In some other possible implementations of this application, a slot table corresponding to the slot format index sent by the network device to the terminal device may alternatively be an extended cyclic prefix format table, that is, each row in the table has symbol attributes of 12 symbols. The terminal device may determine, based on symbol attributes, of 12 symbols corresponding to a subcarrier spacing (for example, 15 kHz, 30 kHz, and 60 kHz), that are indicated by the slot index and the foregoing mapping relationship between slot formats of the extended cyclic prefix at different subcarrier spacings, an extended cyclic prefix format, at a subcarrier spacing (for example, the 60 kHz subcarrier spacing), finally used for transmission of the uplink and downlink data and the SSB.

The following specifically describes a case in which the slot format index indicates the symbol attributes of the 12 symbols in the slot format of the extended cyclic prefix.

For a case in which the slot format index indicates the attributes of the 12 symbols in the slot format of the extended cyclic prefix corresponding to the 60 kHz subcarrier spacing, because the slot format of the extended cyclic prefix needs to ensure SSB transmission, the slot format of the extended cyclic prefix needs to meet the slot formats shown in FIG. 2, to be specific, the extended cyclic prefix format at 60 kHz needs to meet the following requirements: In the first transmission format (or referred to as the first type of symbol attributes), all symbols 3 to 10 need to be downlink symbols, which is equivalent to the slot format in the first slot in the extended cyclic prefix format at 60 kHz in FIG. 2. In the second transmission format (or referred to as the second type of symbol attributes), all symbols 1 to 8 need to be downlink symbols.

Therefore, when the slot table corresponding to the slot format index is an extended cyclic prefix format corresponding to the 60 kHz subcarrier spacing, and the terminal device performs uplink and downlink data transmission by finally using the extended cyclic prefix format corresponding to the 60 kHz subcarrier spacing, the symbol attributes indicated by the slot format index include at least one of the following two types of symbol attributes:

a first type of symbol attributes $A_0 A_1 A_2$ DDDDDDDDF, where F represents a flexible symbol, D represents a downlink symbol, and $A_0$ to $A_2$ each represent any one of a flexible symbol, an uplink symbol, and a downlink symbol; and a first type of symbol attributes $B_0$ DDDDDDDD$B_1$ $B_2$ $B_3$, where F represents a flexible symbol, D represents a downlink symbol, $B_0$ represents a flexible symbol or an uplink symbol, $B_1$ represents a flexible symbol or a downlink symbol, and $B_2$ and $B_3$ each represent any one of a flexible symbol, an uplink symbol, and a downlink symbol.

Specifically, for the first type of symbol attributes, in a possible implementation, possible values of the slot format index and symbol attributes of 12 symbols indicated by each possible value may be shown in Table 8.

TABLE 8

| Slot format (format) index | Symbol indexes in a slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 56 | D | F | F | D | D | D | D | D | D | D | D | F |
| 57 | D | F | U | D | D | D | D | D | D | D | D | F |
| 58 | F | D | D | D | D | D | D | D | D | D | D | F |
| 59 | F | F | D | D | D | D | D | D | D | D | D | F |
| 60 | F | F | F | D | D | D | D | D | D | D | D | F |
| 61 | F | F | U | D | D | D | D | D | D | D | D | F |
| 62 | F | U | D | D | D | D | D | D | D | D | D | F |
| 63 | F | U | F | D | D | D | D | D | D | D | D | F |
| 64 | F | U | U | D | D | D | D | D | D | D | D | F |
| 65 | U | D | D | D | D | D | D | D | D | D | D | F |
| 66 | U | F | D | D | D | D | D | D | D | D | D | F |
| 67 | U | F | F | D | D | D | D | D | D | D | D | F |
| 68 | U | U | D | D | D | D | D | D | D | D | D | F |
| 69 | U | U | F | D | D | D | D | D | D | D | D | F |
| 70 | U | U | U | D | D | D | D | D | D | D | D | F |

It should be understood that Table 8 is merely an example, and the value of the slot format index and the symbol attributes of the 12 symbols corresponding to the slot format index should not be limited. For example, the value of the slot format index in Table 8 may alternatively be another value, for example, 71 to 85.

When receiving any slot format index shown in Table 8, the terminal device may determine a slot format of an extended cyclic prefix at 60 kHz based on the slot format index. The slot format of the extended cyclic prefix at 60 kHz includes a downlink symbol D, at least one uplink symbol U, and at least one flexible symbol F, so that transmission of a URLLC uplink service and a URLLC downlink service is ensured. In addition, the slot format of the extended cyclic prefix at 60 kHz may further meet the requirement in the first transmission format, that is, may ensure SSB transmission.

For the second type of symbol attributes, in a possible implementation, possible values of the slot format index and symbol attributes of 12 symbols indicated by each possible value may be shown in Table 9.

TABLE 9

| Slot format (format) index | Symbol indexes in a slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 56 | F | D | D | D | D | D | D | D | D | D | D | F |
| 57 | F | D | D | D | D | D | D | D | D | F | F |
| 58 | F | D | D | D | D | D | D | D | D | F | U |
| 59 | F | D | D | D | D | D | D | D | F | F | D |
| 60 | F | D | D | D | D | D | D | D | F | F | F |
| 61 | F | D | D | D | D | D | D | D | F | F | U |
| 62 | F | D | D | D | D | D | D | D | F | U | D |
| 63 | F | D | D | D | D | D | D | D | F | U | F |
| 64 | F | D | D | D | D | D | D | D | F | U | U |

TABLE 9-continued

| Slot format (format) index | \multicolumn{12}{c}{Symbol indexes in a slot} | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 65 | U | D | D | D | D | D | D | D | D | F | D | F |
| 66 | U | D | D | D | D | D | D | D | D | D | F | F |
| 67 | U | D | D | D | D | D | D | D | D | D | F | U |
| 68 | U | D | D | D | D | D | D | D | D | D | F | D |
| 69 | U | D | D | D | D | D | D | D | D | F | F | F |
| 70 | U | D | D | D | D | D | D | D | D | F | F | U |
| 71 | U | D | D | D | D | D | D | D | D | F | U | D |
| 72 | U | D | D | D | D | D | D | D | D | F | U | F |
| 73 | U | D | D | D | D | D | D | D | D | F | U | U |

It should be understood that Table 9 is merely an example, and the value of the slot format index and the symbol attributes of the 12 symbols corresponding to the slot format index should not be limited. For example, the value of the slot format index in Table 9 may alternatively be another value.

When receiving any slot format index shown in Table 9, the terminal device may determine a slot format of an extended cyclic prefix at 60 kHz based on the slot format index. The slot format of the extended cyclic prefix at 60 kHz includes a downlink symbol D, at least one uplink symbol U, and at least one flexible symbol F, so that transmission of a URLLC uplink service and a URLLC downlink service is ensured. In addition, the slot format of the extended cyclic prefix at 60 kHz may further meet the requirement in the first transmission format, that is, may ensure SSB transmission.

The symbol attributes of the 12 symbols corresponding to the extended cyclic prefix format corresponding to the 60 kHz subcarrier spacing are indicated to the terminal device, so that the terminal device may directly perform transmission of uplink and downlink data and an SSB on the 12 symbols in the indicated extended cyclic prefix format at 60 kHz, and does not need to perform a slot format mapping and conversion process. In this way, complexity of determining the extended cyclic prefix format at 60 kHz by the terminal device is reduced, and the solution is easy to implement.

In this embodiment of this application, in another possible implementation, the symbol attributes indicated by the slot format index sent by the network device to the terminal device are $Z_0\ Z_1\ DDDC_0\ C_1\ DDDZ_2\ Z_3$, where $Z_0$ represents a flexible symbol or an uplink symbol, $Z_1$ represents a flexible symbol or a downlink symbol, D represents a downlink symbol, $C_0$ and $C_1$ each represent a flexible symbol or a downlink symbol, $Z_2$ represents a flexible symbol or a downlink symbol, and $Z_3$ represents any one of a flexible symbol, an uplink symbol, and a downlink symbol.

Specifically, when a slot table corresponding to the slot format index sent by the network device to the terminal device is an extended cyclic prefix slot format table corresponding to the 30 kHz subcarrier spacing, and the terminal device performs uplink and downlink data transmission by finally using the extended cyclic prefix format corresponding to the 60 kHz subcarrier spacing, because the slot format of the extended cyclic prefix needs to ensure SSB transmission, when the slot table corresponding to the slot format index is the extended cyclic prefix format corresponding to the 30 kHz subcarrier spacing, and a slot format of an extended cyclic prefix is the extended cyclic prefix format corresponding to the 60 kHz subcarrier spacing, symbol attributes of the extended cyclic prefix format at 30 kHz indicated by the slot format index are $Z_0\ Z_1\ DDDC_0\ C_1\ DDDZ_2\ Z_3$, where $Z_0$ represents a flexible symbol or an uplink symbol, $Z_1$ represents a flexible symbol or a downlink symbol, D represents a downlink symbol, $C_0$ and $C_1$ each represent a flexible symbol or a downlink symbol, $Z_2$ represents a flexible symbol or a downlink symbol, and $Z_3$ represents any one of a flexible symbol, an uplink symbol, and a downlink symbol.

For the foregoing symbol attributes of the extended cyclic prefix format at 30 kHz, in a possible implementation, possible values of the slot format index and symbol attributes of 12 symbols indicated by each possible value may be shown in Table 10.

TABLE 10

| Slot format (format) index | \multicolumn{12}{c}{Symbol indexes in a slot} | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 56 | U | D | D | D | D | D | D | D | D | D | D | F |
| 57 | U | D | D | D | D | D | D | D | D | D | F | F |
| 58 | U | D | D | D | D | D | D | D | D | D | F | U |
| 59 | U | D | D | D | D | D | D | D | D | D | D | D |
| 60 | U | D | D | D | D | F | D | D | D | D | D | F |
| 61 | U | D | D | D | D | F | D | D | D | D | F | F |
| 62 | U | D | D | D | D | F | D | D | D | D | F | U |
| 63 | U | D | D | D | D | F | D | D | D | D | D | D |
| 64 | U | D | D | D | D | D | F | D | D | D | D | F |
| 65 | U | D | D | D | D | D | F | D | D | D | F | F |
| 66 | U | D | D | D | D | D | F | D | D | D | F | U |
| 67 | U | D | D | D | D | D | F | D | D | D | D | D |
| 68 | U | D | D | D | F | F | D | D | D | D | D | F |
| 69 | U | D | D | D | F | F | D | D | D | D | F | F |
| 70 | U | D | D | D | F | F | D | D | D | D | F | U |
| 71 | U | D | D | D | F | F | D | D | D | D | D | D |
| 72 | U | F | D | D | D | D | D | D | D | D | D | F |
| 73 | U | F | D | D | D | D | D | D | D | D | F | F |
| 74 | U | F | D | D | D | D | D | D | D | D | F | U |
| 75 | U | F | D | D | D | D | D | D | D | D | D | D |
| 76 | U | F | D | D | D | F | D | D | D | D | D | F |
| 77 | U | F | D | D | D | F | D | D | D | D | F | F |
| 78 | U | F | D | D | D | F | D | D | D | D | F | U |
| 79 | U | F | D | D | D | F | D | D | D | D | D | D |
| 80 | U | F | D | D | D | D | F | D | D | D | D | F |
| 81 | U | F | D | D | D | D | F | D | D | D | F | F |
| 82 | U | F | D | D | D | D | F | D | D | D | F | U |
| 83 | U | F | D | D | D | D | F | D | D | D | D | D |
| 84 | U | F | D | D | F | F | D | D | D | D | D | F |
| 85 | U | F | D | D | F | F | D | D | D | D | F | F |
| 86 | U | F | D | D | F | F | D | D | D | D | F | U |
| 87 | U | F | D | D | F | F | D | D | D | D | D | D |
| 88 | F | F | D | D | D | D | D | D | D | D | D | F |
| 89 | F | F | D | D | D | D | D | D | D | D | F | F |
| 90 | F | F | D | D | D | D | D | D | D | D | F | U |
| 91 | F | F | D | D | D | D | D | D | D | D | D | D |
| 92 | F | F | D | D | F | D | D | D | D | D | D | F |
| 93 | F | F | D | D | F | D | D | D | D | D | F | F |
| 94 | F | F | D | D | F | D | D | D | D | D | F | U |
| 95 | F | F | D | D | F | D | D | D | D | D | D | D |
| 96 | F | F | D | D | D | F | D | D | D | D | D | F |
| 97 | F | F | D | D | D | F | D | D | D | D | F | F |
| 98 | F | F | D | D | D | F | D | D | D | D | F | U |
| 99 | F | F | D | D | D | F | D | D | D | D | D | D |
| 100 | F | F | D | D | F | F | D | D | D | D | D | F |
| 101 | F | F | D | D | F | F | D | D | D | D | F | F |
| 102 | F | F | D | D | F | F | D | D | D | D | F | U |
| 103 | F | F | D | D | F | F | D | D | D | D | D | D |

It should be understood that Table 10 is merely an example, and the value of the slot format index and the symbol attributes of the 12 symbols corresponding to the slot format index should not be limited. For example, the value of the slot format index in Table 10 may alternatively be another value.

When receiving any slot format index shown in Table 10, the terminal device may determine a slot format of an extended cyclic prefix at 30 kHz based on the slot format index. After determining the slot format of the extended cyclic prefix at 30 kHz, the terminal device determines an extended cyclic prefix format at 60 kHz based on a relationship between the slot format of the extended cyclic prefix at 30 kHz and the slot format of the extended cyclic prefix at 60 kHz. In addition, the determined extended cyclic prefix format at 60 kHz needs to meet SSB transmission. Furthermore, there is an uplink symbol U and/or a flexible symbol F included in another symbol location. In other words, uplink transmission, downlink transmission, and a transmission latency requirement of a URLLC service can be further met.

The symbol attributes corresponding to the extended cyclic prefix format corresponding to the 30 kHz subcarrier spacing are indicated to the terminal device, so that the terminal device determines the slot format of the extended cyclic prefix at 60 kHz by using only the mapping relationship between the extended cyclic prefix format at 60 kHz and the slot format of the extended cyclic prefix at 30 kHz, and the terminal device can more accurately determine the extended cyclic prefix format at 60 kHz. In this way, complexity of determining the extended cyclic prefix format at 60 kHz by the terminal device is reduced. Further, because symbol attributes of only 12 symbols need to be notified, resources occupied by notification of the symbol attributes can be reduced, and resource utilization is improved.

In this embodiment of this application, in another possible implementation, the symbol attributes indicated by the slot format index sent by the network device to the terminal device are $C_0$ DD DD $C_1$ $C_2$ DD DD $C_3$, where $C_0$ to $C_3$ each represent a flexible symbol or a downlink symbol, and D represents a downlink symbol.

Specifically, when a slot table corresponding to the slot format index sent by the network device to the terminal device is an extended cyclic prefix slot format table corresponding to the 15 kHz subcarrier spacing, and the terminal device performs uplink and downlink data transmission by finally using the extended cyclic prefix format at 60 kHz, because the slot format of the extended cyclic prefix needs to ensure SSB transmission, when the slot table corresponding to the slot format index is the extended cyclic prefix format corresponding to the 15 kHz subcarrier spacing, symbol attributes of the extended cyclic prefix format at 15 kHz indicated by the slot format index are $C_0$ DD DD $C_1$ $C_2$ DD DD $C_3$, where $C_0$ to $C_3$ each represent a flexible symbol or a downlink symbol, and D represents a downlink symbol.

For the foregoing symbol attributes of the extended cyclic prefix format at 15 kHz, in a possible implementation, possible values of the slot format index and symbol attributes of 12 symbols indicated by each possible value may be shown in Table 11.

TABLE 11

| Slot format | Symbol indexes in a slot | | | | | | | | | | | |
|---|---|---|---|---|---|---|---|---|---|---|---|---|
| (format) index | 0 | 1 | 2 | 3 | 4 | 5 | 6 | 7 | 8 | 9 | 10 | 11 |
| 56 | F | D | D | D | D | F | F | D | D | D | D | D |
| 57 | F | D | D | D | D | F | F | D | D | D | D | F |
| 58 | F | D | D | D | D | F | D | D | D | D | D | D |
| 59 | F | D | D | D | D | F | D | D | D | D | D | F |
| 60 | F | D | D | D | D | D | F | D | D | D | D | D |
| 61 | F | D | D | D | D | D | F | D | D | D | D | F |
| 62 | F | D | D | D | D | D | D | D | D | D | D | D |

TABLE 11-continued

| Slot format | Symbol indexes in a slot | | | | | | | | | | | |
|---|---|---|---|---|---|---|---|---|---|---|---|---|
| (format) index | 0 | 1 | 2 | 3 | 4 | 5 | 6 | 7 | 8 | 9 | 10 | 11 |
| 63 | F | D | D | D | D | D | D | D | D | D | D | F |
| 64 | F | D | D | D | D | F | F | D | D | D | D | D |
| 65 | F | D | D | D | D | F | F | D | D | D | D | F |
| 66 | F | D | D | D | D | F | D | D | D | D | D | D |
| 67 | F | D | D | D | D | F | D | D | D | D | D | F |
| 68 | F | D | D | D | D | D | F | D | D | D | D | D |
| 69 | F | D | D | D | D | D | F | D | D | D | D | F |
| 70 | F | D | D | D | D | D | D | D | D | D | D | D |
| 71 | F | D | D | D | D | D | D | D | D | D | D | F |

It should be understood that Table 11 is merely an example, and the value of the slot format index and the symbol attributes of the 12 symbols corresponding to the slot format index should not be limited. For example, the value of the slot format index in Table 11 may alternatively be another value.

When receiving any slot format index shown in Table 11, the terminal device may determine a slot format of an extended cyclic prefix at 15 kHz based on the slot format index. After determining the slot format of the extended cyclic prefix at 15 kHz, the terminal device determines an extended cyclic prefix format at 60 kHz based on a relationship between the slot format of the extended cyclic prefix at 15 kHz and the slot format of the extended cyclic prefix at 60 kHz. In addition, the determined extended cyclic prefix format at 60 kHz needs to meet SSB transmission. Furthermore, there is an uplink symbol U and/or a flexible symbol F included in another symbol location. In other words, uplink transmission, downlink transmission, and a transmission latency requirement of a URLLC service can be further met.

The symbol attributes corresponding to the extended cyclic prefix format corresponding to the 15 kHz subcarrier spacing are indicated to the terminal device, so that the terminal device determines the slot format of the extended cyclic prefix at 60 kHz by using only the mapping relationship between the extended cyclic prefix format at 60 kHz and the slot format of the extended cyclic prefix at 15 kHz, and the terminal device can more accurately determine the extended cyclic prefix format at 60 kHz. In this way, complexity of determining the extended cyclic prefix format at 60 kHz by the terminal device is reduced. Further, because symbol attributes of only 12 symbols need to be notified, resources occupied by notification of the symbol attributes can be reduced, and resource utilization is improved.

An example in which the slot table corresponding to the slot format index is the extended cyclic prefix slot format table corresponding to the 15 kHz subcarrier spacing, the extended cyclic prefix slot format table corresponding to the 30 kHz subcarrier spacing, or the extended cyclic prefix slot format table corresponding to the 60 kHz subcarrier spacing is used for description above. When the slot format index indicates an extended cyclic slot format corresponding to a row of 12 symbols, the 12 symbols may be 12 symbols in 14 symbols with a corresponding normal cyclic prefix at a same subcarrier spacing. For example, the 12 symbols may be first 12 symbols or last 12 symbols in the 14 symbols with the normal cyclic prefix, or the first symbol (whose symbol index is 0) to the sixth symbol (whose symbol index is 5) and the eighth symbol (whose symbol index is 7) to the thirteenth symbol (whose symbol index is 12) in the 14 symbols with the normal cyclic prefix, or 12 symbols in other locations in the 14 symbols with the normal cyclic prefix. It may be understood that the terminal device determines locations of 12 symbols in 14 symbols in a slot table. The terminal device determines, based on symbol attributes at the locations of the 12 symbols, attributes of the 12 symbols corresponding to the slot with the extended cyclic prefix.

For example, for the first type of symbol attributes $A_0$ $A_1$ $A_2$ DDDDDDDDF indicated by the slot format index of the extended cyclic prefix at 60 kHz, the 12 symbols may be the first symbol to the sixth symbol (whose symbol indexes are 0 to 5) and the eighth symbol to the thirteenth symbol (whose symbol indexes are 7 to 12) in 14 symbols corresponding to the foregoing first type of symbol attributes indicated by the foregoing slot format index of the normal cyclic prefix at 60 kHz. Descriptions are provided with reference to Table 8 and Table 4. For the extended cyclic prefix slot format index table at 60 kHz shown in Table 8, 12 symbols indicated by each slot format index may be the first symbol to the sixth symbol (whose symbol indexes are 0 to 5) and the eighth symbol to the thirteenth symbol (whose symbol indexes are 7 to 12) in 13 symbols indicated by a corresponding slot format index in the normal cyclic prefix slot format index table at 60 kHz shown in Table 4.

For another example, for the symbol attributes $Z_0$ $Z_1$ $DDDC_0$ $C_1$ $DDDZ_2$ $Z_3$ indicated by the foregoing slot format index of the extended cyclic prefix at 30 kHz, the 12 symbols may be first 12 symbols or last 12 symbols in 14 symbols corresponding to 14 symbol attributes indicated by the slot format index of the normal cyclic prefix at 30 kHz, or the first symbol (whose symbol index is 0) to the sixth symbol (whose symbol index is 5) and the eighth symbol (whose symbol index is 7) to the thirteenth symbol (whose symbol index is 12) in 14 symbols with the normal cyclic prefix at 30 kHz.

For another example, for the symbol attributes $C_0$ DD DD $C_1$ $C_2$ DD DD $C_3$ indicated by the foregoing slot format index of the extended cyclic prefix at 15 kHz, the 12 symbols may be first 12 symbols or last 12 symbols in 14 symbols corresponding to 14 symbol attributes indicated by the foregoing slot format index of the normal cyclic prefix at 15 kHz.

The symbols indicated by the slot format index are first 12 symbols, last 12 symbols, or the first symbol to the sixth symbol and the eighth symbol to the thirteenth symbol in the 14 symbols indicated by a row in the slot format table, so that the network device can more accurately and conveniently determine the symbol attributes of the 12 symbols indicated by the slot format index. In this way, complexity of a case in which the network device determines the symbol attributes of the 12 symbols indicated by the slot format index is reduced, and the solution is easy to implement. In addition, the extended cyclic prefix format at 60 kHz determined by the terminal device based on the symbol attributes of the 12 symbols indicated by the slot format index can meet transmission of a URLLC uplink service and a URLLC downlink service, and SSB transmission can be ensured. This ensures communication quality and efficiency.

It should be further understood that, only an example in which the subcarrier spacing corresponding to the slot table indicated by the slot format index sent by the network device to the terminal device is any one of the 15 kHz subcarrier spacing, the 30 kHz subcarrier spacing, and the 60 kHz subcarrier spacing, and the terminal device determines, based on the slot format index, the slot format of the extended cyclic prefix corresponding to the 60 kHz subcarrier spacing is used for description above. In this embodiment of this application, the subcarrier spacing corresponding to the slot table indicated by the slot format index sent by the network device to the terminal device may alternatively be any one or more of the 15 kHz subcarrier spacing, the 30 kHz subcarrier spacing, the 60 kHz subcarrier spacing, a 120 kHz subcarrier spacing, and a 240 kHz subcarrier spacing, and the terminal device may alternatively determine, based on the slot format index, any one of the slot format of the extended cyclic prefix corresponding to the 15 kHz subcarrier spacing, the slot format of the extended cyclic prefix corresponding to the 30 kHz subcarrier spacing, a slot format of an extended cyclic prefix corresponding to the 120 kHz subcarrier spacing, and a slot format of an extended cyclic prefix corresponding to the 240 kHz subcarrier spacing. In addition, the subcarrier spacing corresponding to the slot table indicated by the slot format index sent by the network device to the terminal device is less than or equal to a subcarrier spacing corresponding to a slot format of an extended cyclic prefix that needs to be determined by the terminal device based on the slot format index.

Figure 4:
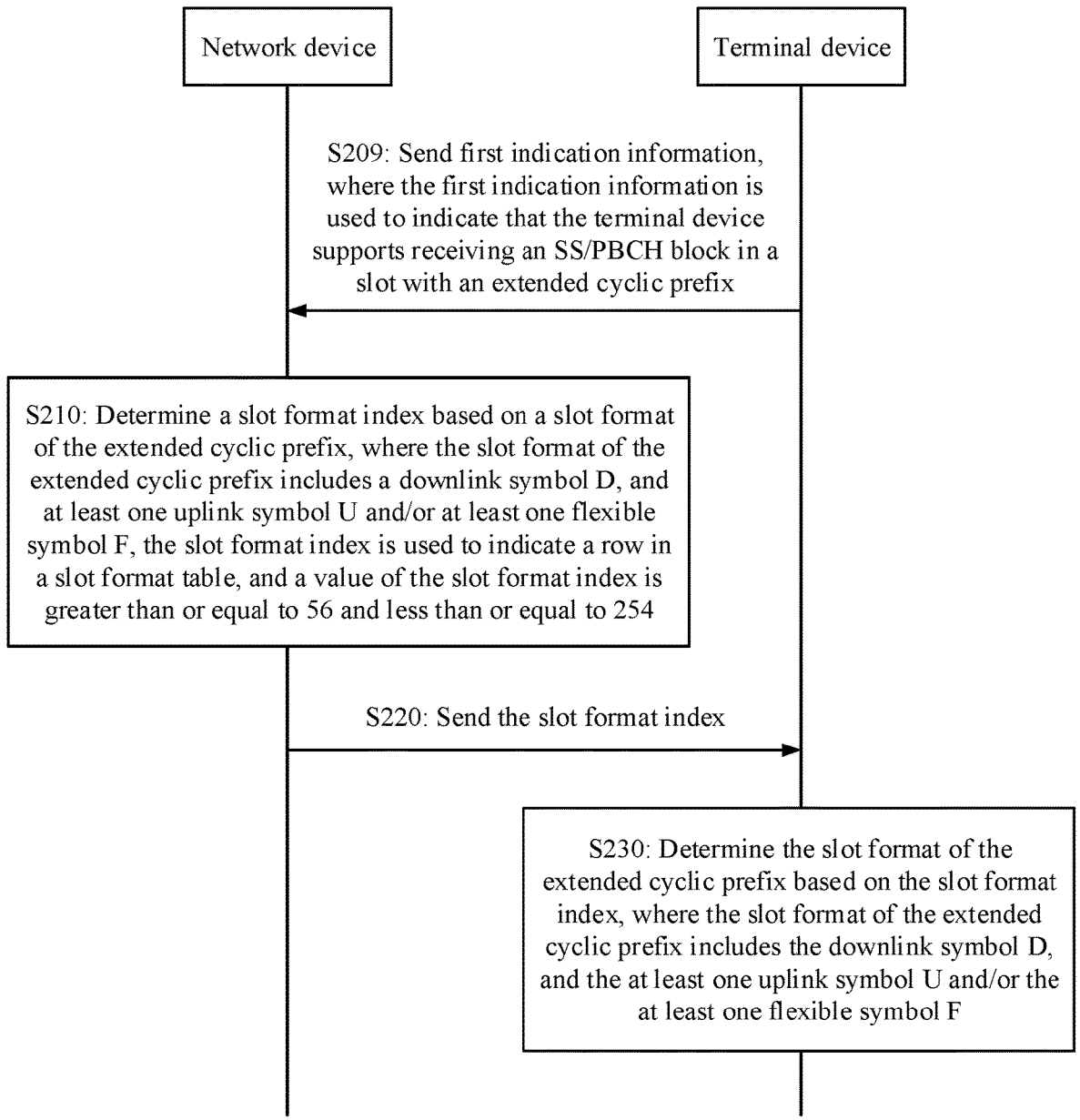
FIG. 4 is a schematic interaction diagram of another slot format indication method according to an embodiment of this application.

In some embodiments of this application, FIG. 4 is used as an example. Based on the method steps shown in FIG. 3, the method 200 further includes S209.

S209: The terminal device sends first indication information to the network device, where the first indication information is used to indicate that the terminal device supports receiving an SS/PBCH block in a slot with the extended cyclic prefix.

For descriptions of S210 to S230 shown in FIG. 4, refer to the foregoing descriptions of S210 to S230. For brevity, details are not described herein again.

In S209, the terminal device may report, to the network device, capability information of the terminal device that the terminal device supports receiving a slot format index of the slot corresponding to the extended cyclic prefix and/or the SS/PBCH block corresponding to the extended cyclic prefix. That is, the terminal device may indicate, to the network device by using the first indication information, that the terminal device supports receiving data or control information transmitted by using the slot format of the extended cyclic prefix. Further, a subcarrier spacing corresponding to the slot format of the extended cyclic prefix may be any one or more of a 15 kHz subcarrier spacing, a 30 kHz subcarrier spacing, a 60 kHz subcarrier spacing, a 120 kHz subcarrier spacing, and a 240 kHz subcarrier spacing. After the terminal device reports, to the network device, that the terminal device supports receiving the data or the control information sent by using the slot of the extended cyclic prefix, the network device may perform steps S210 and S220 to send the slot format index to the terminal device, where the slot format index is used by the terminal device to determine the slot format of the extended cyclic prefix. After determining the slot format of the extended cyclic prefix, the terminal device may receive an SSB in the slot format of the extended cyclic prefix, and send uplink data and receive downlink data in the slot format of the extended cyclic prefix.

Figure 5:
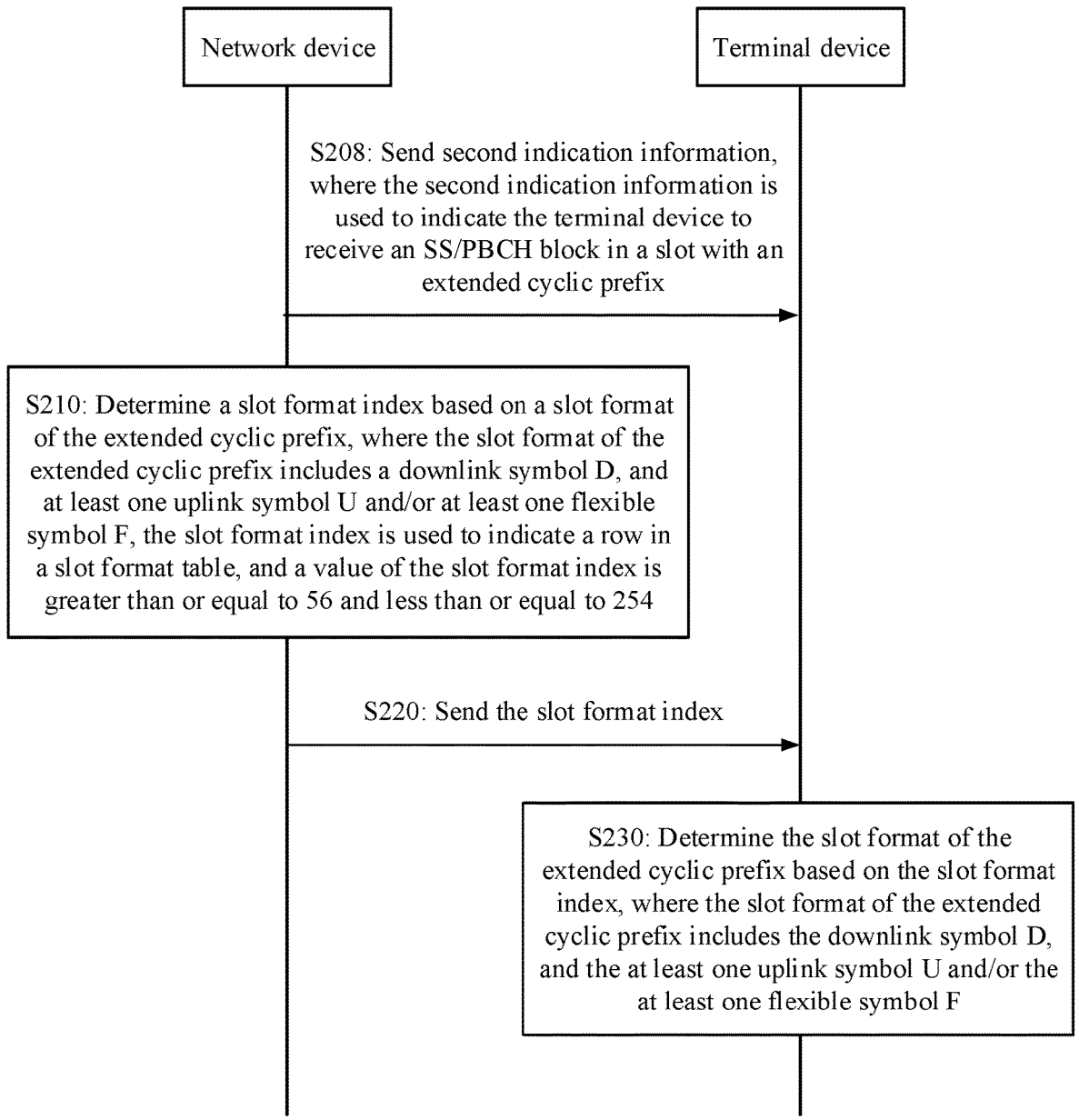
FIG. 5 is a schematic interaction diagram of still another slot format indication method according to an embodiment of this application.

In some embodiments of this application, FIG. 5 is used as an example. Based on the method steps shown in FIG. 3, the method 200 further includes S208.

S208: The terminal device receives second indication information sent by the network device, where the second indication information is used to indicate the terminal device to receive an SS/PBCH block in a slot with the extended cyclic prefix.

For descriptions of S210 to S230 shown in FIG. 5, refer to the foregoing descriptions of S210 to S230. For brevity, details are not described herein again.

In S208, the network device may further send the second indication information to the terminal device, where the second indication information may be used to indicate the terminal device to receive a slot format index of the slot corresponding to the extended cyclic prefix, and/or receive the SS/PBCH block corresponding to the extended cyclic prefix. For example, when the capability information of the terminal device is that the terminal device does not support receiving the slot format index of the slot corresponding to the extended cyclic prefix ECP, and/or does not support receiving the SS/PBCH block corresponding to the ECP, the network device may configure the terminal device to receive the slot format index of the slot corresponding to the extended cyclic prefix, and/or support receiving the SS/PBCH block corresponding to the extended cyclic prefix. In this case, the network device configures, by using the second indication information (or may also be referred to as configuration information), the terminal device to support receiving the slot format index of the slot corresponding to the extended cyclic prefix, and/or support receiving the SS/PBCH block corresponding to the extended cyclic prefix. Then, the network device may perform steps S210 and S220 to send the slot format index to the terminal device, where the slot format index is used by the terminal device to determine the slot format of the extended cyclic prefix. After determining the slot format of the extended cyclic prefix, the terminal device may receive an SSB in the slot format of the extended cyclic prefix, and send uplink data and receive downlink data in the slot format of the extended cyclic prefix.

It should be understood that the steps shown in FIG. 5 may also include S208.

According to the slot format indication method provided in this application, the network device sends the slot format index to the terminal device, and a slot format indicated by the slot format index may be an extended cyclic slot format, or may be a normal cyclic slot format. The terminal device determines symbol attributes in the extended cyclic slot format based on the slot format index. In addition, the slot format of the extended cyclic prefix includes a downlink symbol D, and at least one uplink symbol U and/or at least one flexible symbol F. The slot format of the extended cyclic prefix can meet uplink transmission, downlink transmission, and the transmission latency requirement of the URLLC service. In this way, normal transmission of the URLLC service is ensured. Further, the slot format of the extended cyclic prefix may further meet normal transmission of the SSB. In this way, communication quality is further ensured.

It should be understood that, in this embodiment of this application, the network device may send the second indication information to the terminal by using higher layer signaling, physical layer signaling, or dedicated configuration information. The higher layer signaling may include, for example, radio resource control (radio resource control, RRC) signaling, media access control (media access control, MAC) control element (control element, CE) signaling, and radio link control (radio link control, RLC) signaling. The physical layer signaling may include, for example, downlink control information (downlink control information, DCI).

It should be further understood that in the embodiments of this application, the first, the second, and the like are merely used to indicate that a plurality of objects are different. For example, the first type of symbol attributes and the second type of symbol attributes are merely intended to indicate different types of symbol attributes, and should not cause any impact on the symbol attributes. The foregoing first, second, and the like should not impose any limitation on the embodiments of this application.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that numerals used in the embodiments of this application are differentiated merely for ease of description, but are not used to limit the scope of the embodiments of this application. The sequence numbers of the foregoing processes do not mean execution sequences. The execution sequences of the processes should be determined according to functions and internal logic of the processes, and should not be construed as any limitation on the implementation processes of the embodiments of this application.

It should be understood that, the foregoing descriptions are merely intended to help a person skilled in the art better understand the embodiments of this application, and are not intended to limit the scope of the embodiments of this application. It is clear that a person skilled in the art may make various equivalent modifications or changes based on the foregoing examples. For example, in the foregoing method 200, some steps may be unnecessary or some steps may be newly added, or any two or more of the foregoing embodiments may be combined. Such modified, changed, or combined solutions also fall within the scope of the embodiments of this application.

It should be further understood that the foregoing descriptions of the embodiments of this application focus on differences between the embodiments. For same or similar parts that are not mentioned, refer to each other. For brevity, details are not described herein again.

It should be further understood that in the embodiments of this application, "predefinition" may be implemented by pre-storing corresponding code or a corresponding table in a device (for example, including a terminal and a network device) or in another manner that can be used to indicate related information. A specific implementation of "predefinition" is not limited in this application.

The slot format indication method in the embodiments of this application is described in detail above with reference to FIG. 1 to FIG. 5. The following describes in detail the communication apparatuses in the embodiments of this application with reference to FIG. 6 to FIG. 11.

Figure 6:
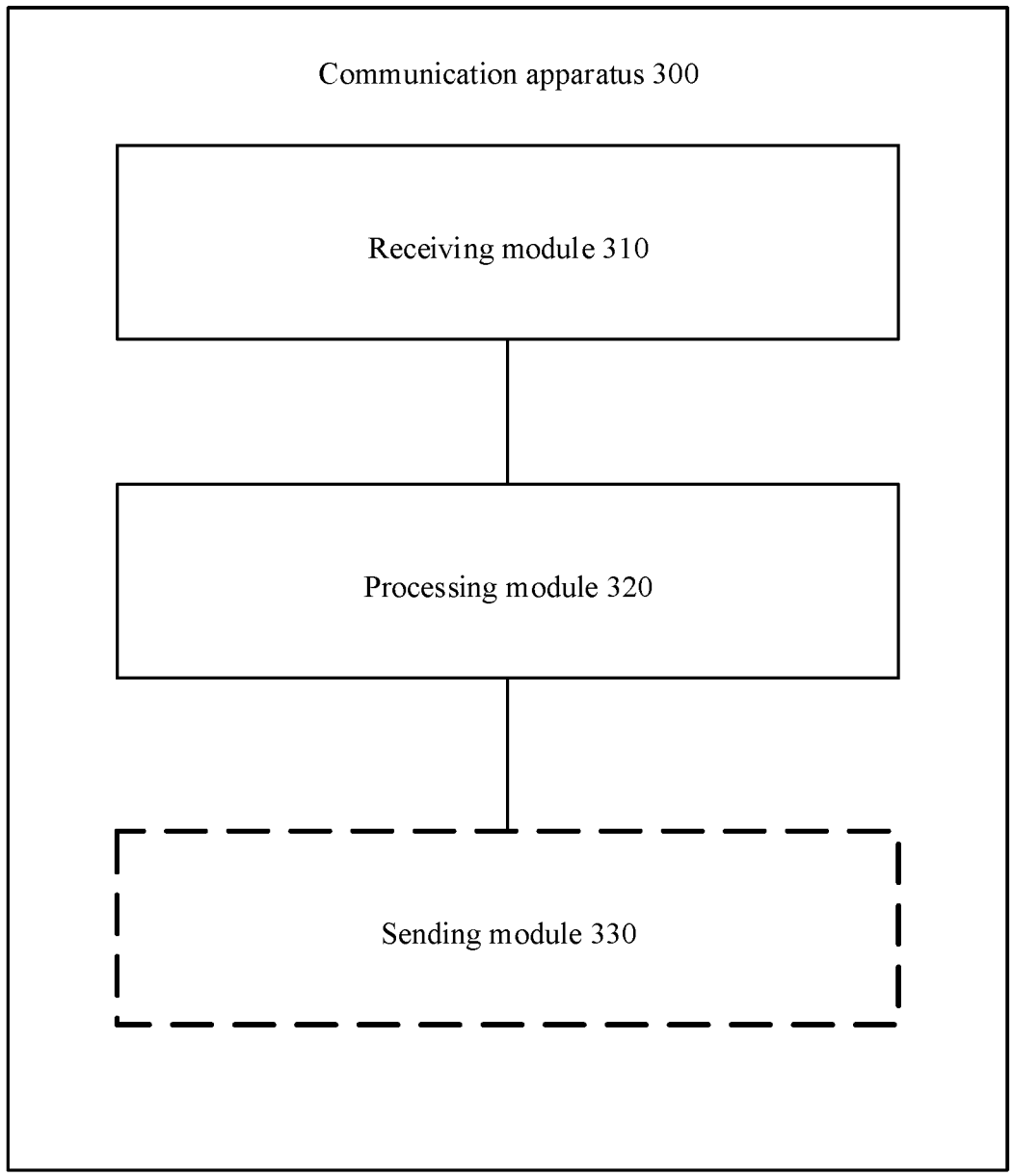
FIG. 6 is a schematic diagram of a communication apparatus according to an embodiment of this application.

FIG. 6 is a schematic block diagram of a communication apparatus 300 according to an embodiment of this application. The apparatus 300 may correspond to the terminal device described in the method 200, or may be a chip or a component used in the terminal device. Modules or units in the apparatus 300 are configured to perform actions or processing processes performed by the terminal device in the foregoing method 200. As shown in FIG. 6, the communication apparatus 300 may include: a receiving module 310, configured to receive a slot format index, where the slot format index is used to indicate a row in a slot format table, the row in the slot format table is used to indicate symbol attributes respectively corresponding to at least 12 symbols, the symbol attribute includes a location of an uplink symbol U, a downlink symbol D, or a flexible symbol F, and a value of the slot format index is greater than or equal to 56 and less than or equal to 254; and a processing module 320, configured to determine a slot format of an extended cyclic prefix based on the slot format index, where the slot format of the extended cyclic prefix includes a downlink symbol D, and at least one uplink symbol U and/or at least one flexible symbol F.

The communication apparatus provided in this application receives the slot format index sent by a network device, where the slot format index is used by the apparatus to determine the slot format of the extended cyclic prefix, and the slot format of the extended cyclic prefix includes a downlink symbol D, and at least one uplink symbol U and/or at least one flexible symbol F. The slot format of the extended cyclic prefix can meet uplink transmission, downlink transmission, and a transmission latency requirement of a URLLC service for the apparatus, and normal transmission of an SSB can be ensured. In this way, normal transmission of the URLLC service is ensured.

Optionally, in some embodiments of this application, the symbol attributes include at least one of the following two types of symbol attributes:

a first type of symbol attributes $Y_0 Y_1 Y_2 Z_0 DDDDDDDD Y_3 Y_4$, where D represents a downlink symbol, $Y_0$ to $Y_3$ each represent any one of a flexible symbol, an uplink symbol, and a downlink symbol, $Z_0$ represents a flexible symbol or a downlink symbol, and $Y_4$ represents a flexible symbol or an uplink symbol; and a second type of symbol attributes $X_0 X_1 DDDDDDDDX_2 X_3 X_4 X_5$, where D represents a downlink symbol, $X_0$ and $X_1$ each represent a flexible symbol or an uplink symbol, $X_2$ represents a flexible symbol or a downlink symbol, $X_3$ represents a flexible symbol or an uplink symbol, and $X_4$ and $X_5$ each represent any one of a flexible symbol, an uplink symbol, and a downlink symbol.

Optionally, in some embodiments of this application, the symbol attributes are $Z_0 Z_1 DDDD Z_2 Z_3 DDDD Z_4 Z_5$, where $Z_0$ to $Z_5$ each represent a flexible symbol or an uplink symbol, and D represents a downlink symbol.

Optionally, in some embodiments of this application, the symbol attributes are $Z_0 DD FDD F Z_1 DD Z_2 DD Z_3$, where F represents a flexible symbol, $Z_1$ to $Z_3$ each represent a flexible symbol or an uplink symbol, and D represents a downlink symbol.

Optionally, in some embodiments of this application, the symbol attributes include at least one of the following two types of symbol attributes:

a first type of symbol attributes $A_0 A_1 A_2 DDDDDDDDF$, where F represents a flexible symbol, D represents a downlink symbol, and $A_0$ to $A_2$ each represent any one of a flexible symbol, an uplink symbol, and a downlink symbol; and a first type of symbol attributes $B_0 DDDDDDDDB_1 B_2 B_3$, where F represents a flexible symbol, D represents a downlink symbol, $B_0$ represents a flexible symbol or an uplink symbol, $B_1$ represents a flexible symbol or a downlink symbol, and $B_2$ and $B_3$ each represent any one of a flexible symbol, an uplink symbol, and a downlink symbol.

Optionally, in some embodiments of this application, the symbol attributes are $Z_0 Z_1 DDDC_0 C_1 DDDZ_2 Z_3$, where $Z_0$ represents a flexible symbol or an uplink symbol, $Z_1$ represents a flexible symbol or a downlink symbol, D represents a downlink symbol, $C_0$ and $C_1$ each represent a flexible symbol or a downlink symbol, $Z_2$ represents a flexible symbol or a downlink symbol, and $Z_3$ represents any one of a flexible symbol, an uplink symbol, and a downlink symbol.

Optionally, in some embodiments of this application, the symbol attributes are $C_0 DD DD C_1 C_2 DD DD C_3$, where $C_0$ to $C_3$ each represent a flexible symbol or a downlink symbol, and D represents a downlink symbol.

Optionally, in some embodiments of this application, symbols indicated by the slot format index are 12 symbols in 14 symbols indicated by the row in the slot format table.

Optionally, in some embodiments of this application, the 12 symbols are first 12 symbols, last 12 symbols, or the first symbol to the sixth symbol and the eighth symbol to the thirteenth symbol in the 14 symbols.

Optionally, in some embodiments of this application, symbol attributes of 14 symbols indicated by the slot format index include: A downlink symbol D and an uplink symbol U are two consecutive symbols, and a symbol index of the downlink symbol D is less than a symbol index of the uplink symbol U. A subcarrier spacing corresponding to a slot format indicated by the slot format index is less than or equal to a subcarrier spacing corresponding to the slot format of the extended cyclic prefix.

Optionally, in some embodiments of this application, the apparatus 300 further includes a sending module 330 that sends first indication information, where the first indication information is used to indicate that the communication apparatus supports receiving a synchronization broadcast block (SS/PBCH block) in a slot with the extended cyclic prefix.

Optionally, in some embodiments of this application, the receiving module 310 is further configured to receive second indication information, where the second indication information is used to indicate the communication apparatus to receive the synchronization broadcast block (SS/PBCH block) in the slot with the extended cyclic prefix.

Optionally, in some embodiments of this application, the subcarrier spacing corresponding to the slot format indicated by the slot format index is less than or equal to the subcarrier spacing corresponding to the slot format of the extended cyclic prefix.

Optionally, in some embodiments of this application, the subcarrier spacing corresponding to the slot format of the extended cyclic prefix is any one of a 30 kHz subcarrier spacing, a 60 kHz subcarrier spacing, a 120 kHz subcarrier spacing, and a 240 kHz subcarrier spacing.

It should be understood that, for specific processes in which the units in the apparatus 300 perform the foregoing corresponding steps, refer to the foregoing descriptions related to the terminal device with reference to the embodiments shown in FIG. 3 to FIG. 5 and the related embodiments of the method 200. For brevity, details are not described herein again.

Optionally, the receiving module (unit) 310 and the sending module (unit) 330 are configured to perform the steps of receiving information and sending information by the terminal device in the embodiments shown in FIG. 3 to FIG. 5 and the embodiments of the method 200. Optionally, the communication apparatus 300 may further include a storage module, configured to store instructions executed by the processing module 320, the receiving module 310, and the sending module 330. The processing module 320, the receiving module 310, and the sending module 330 are communicatively connected to the storage module, and store storage instructions. The processing module 320 is configured to execute the instructions stored in the storage module. The receiving module 310 and the sending module 330 are configured to perform specific signal receiving and sending under driving of the processing module 320.

Figure 7:
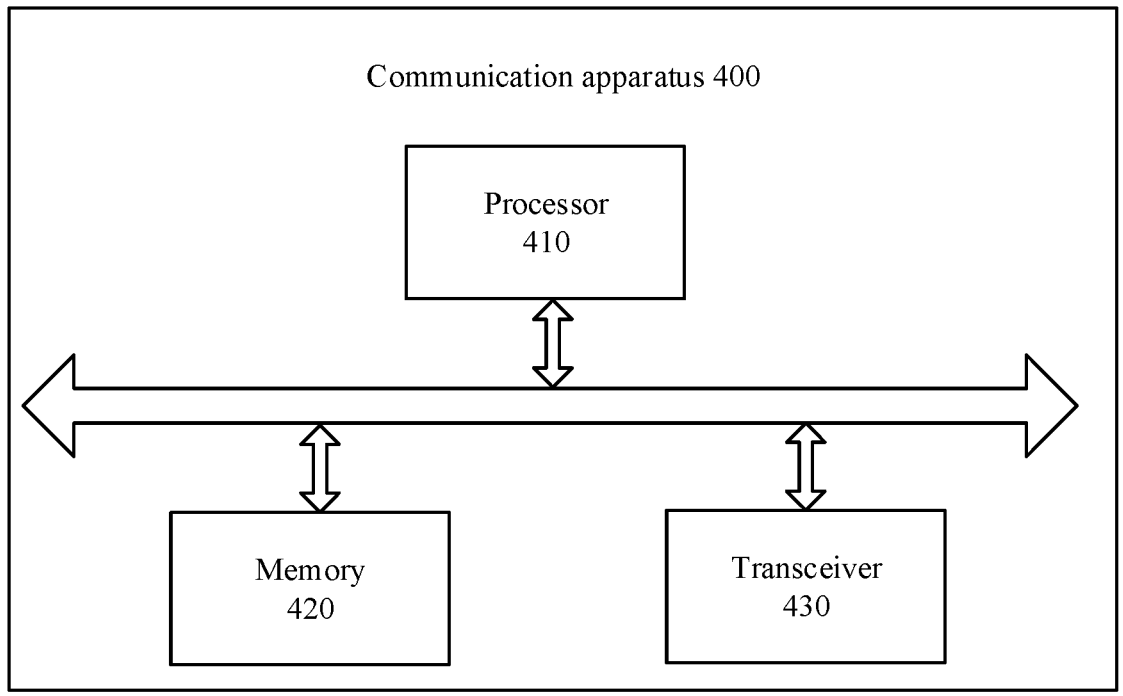
FIG. 7 is a schematic diagram of another communication apparatus according to an embodiment of this application.

It should be understood that the receiving module 310 and the sending module 330 may be a transceiver, an input/output interface, or an interface circuit. The storage unit may be a memory. The processing module 320 may be implemented by a processor. As shown in FIG. 7, a communication apparatus 400 may include a processor 410, a memory 420, and a transceiver 430.

The communication apparatus 300 shown in FIG. 6 or the communication apparatus 400 shown in FIG. 7 can implement steps performed by the terminal device in the embodiments of the foregoing method 200 and the embodiments shown in FIG. 3 to FIG. 5. For similar descriptions, refer to the descriptions in the foregoing corresponding methods. To avoid repetition, details are not described herein again.

The communication apparatus 300 shown in FIG. 6 or the communication apparatus 400 shown in FIG. 7 may be a terminal device.

Figure 8:
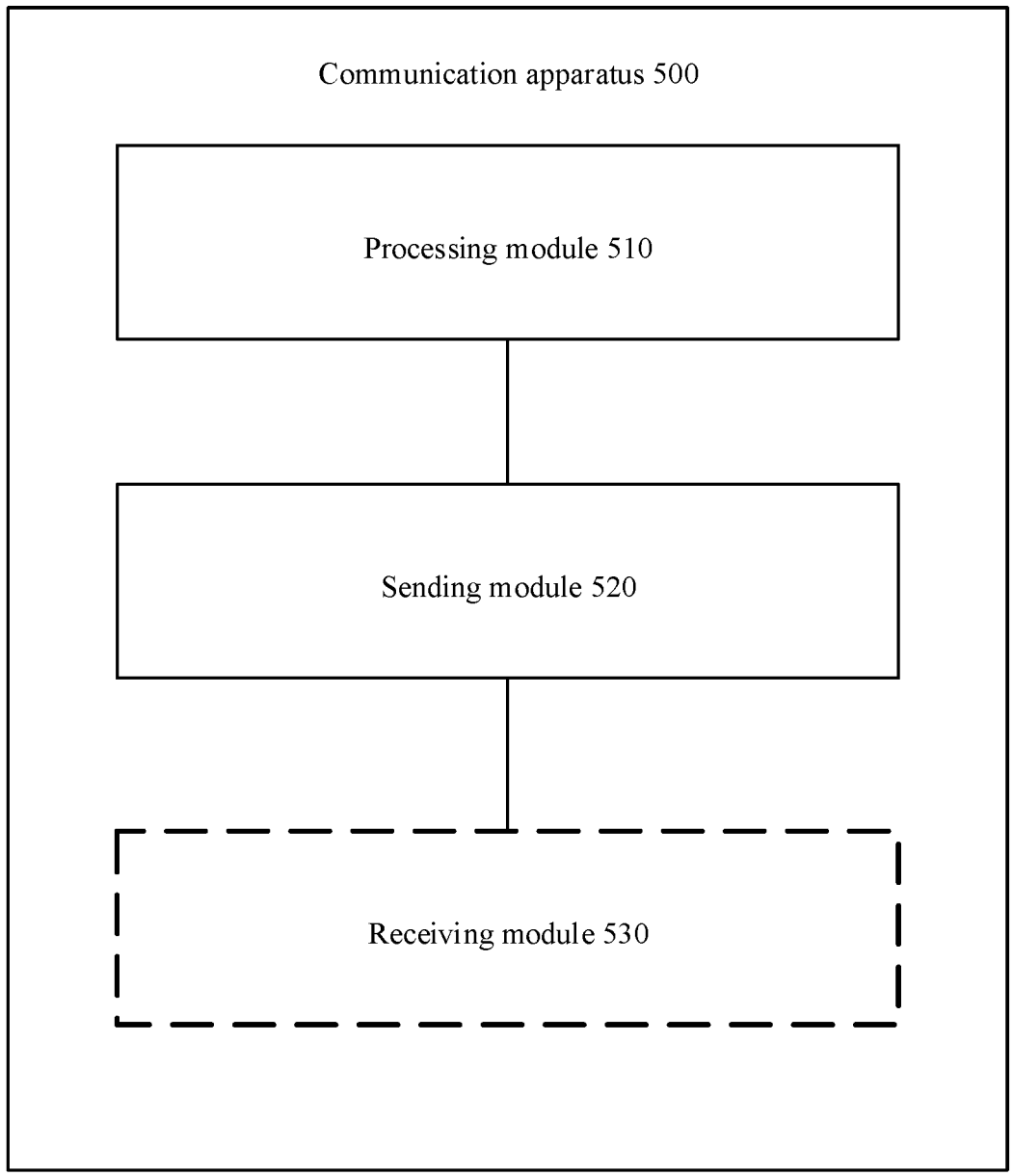
FIG. 8 is a schematic diagram of a communication apparatus according to an embodiment of this application.

FIG. 8 is a schematic block diagram of a communication apparatus 500 according to an embodiment of this application. The apparatus 500 may correspond to the network device described in the method 200, or may be a chip or a component used in the network. Modules or units in the apparatus 500 are configured to perform actions or processing processes performed by the network device in the foregoing method 200. As shown in FIG. 8, the communication apparatus 500 may include a processing module 510 and a sending module 520.

The processing module 510 is configured to determine a slot format index based on a slot format of an extended cyclic prefix, where the slot format of the extended cyclic prefix includes a downlink symbol D, and at least one uplink symbol U and/or at least one flexible symbol F, the slot format index is used to indicate a row in a slot format table, the row in the slot format table is used to indicate symbol attributes respectively corresponding to at least 12 symbols, the symbol attribute includes a location of an uplink symbol U, a downlink symbol D, or a flexible symbol F, and a value of the slot format index is greater than or equal to 56 and less than or equal to 254.

The sending module 520 is configured to send the slot format index.

The communication apparatus provided in this application sends the slot format index to a terminal device, where the slot format index is used by the terminal device to determine the slot format of the extended cyclic prefix, and the slot format of the extended cyclic prefix includes a downlink symbol D, and at least one uplink symbol U and/or at least one flexible symbol F. The slot format of the extended cyclic prefix can meet uplink transmission, downlink transmission, and a transmission latency requirement of a URLLC service for the apparatus, and normal transmission of an SSB can be ensured. In this way, normal transmission of the URLLC service is ensured.

Optionally, in some embodiments of this application, the symbol attributes include at least one of the following two types of symbol attributes:

a first type of symbol attributes $Y_0 Y_1 Y_2 Z_0$DDDDDDDD $Y_3 Y_4$, where D represents a downlink symbol, $Y_0$ to $Y_3$ each represent any one of a flexible symbol, an uplink symbol, and a downlink symbol, $Z_0$ represents a flexible symbol or a downlink symbol, and $Y_4$ represents a flexible symbol or an uplink symbol; and a second type of symbol attributes $X_0 X_1$ DDDDDDDD$X_2 X_3 X_4 X_5$, where D represents a downlink symbol, $X_0$ and $X_1$ each represent a flexible symbol or an uplink symbol, $X_2$ represents a flexible symbol or a downlink symbol, $X_3$ represents a flexible symbol or an uplink symbol, and $X_4$ and $X_5$ each represent any one of a flexible symbol, an uplink symbol, and a downlink symbol.

Optionally, in some embodiments of this application, the symbol attributes are $Z_0 Z_1$ DDDD $Z_2 Z_3$ DDDD $Z_4 Z_5$, where $Z_0$ to $Z_5$ each represent a flexible symbol or an uplink symbol, and D represents a downlink symbol.

Optionally, in some embodiments of this application, the symbol attributes are $Z_0$ DD FDD F $Z_1$ DD $Z_2$DD $Z_3$, where F represents a flexible symbol, $Z_1$ to $Z_3$ each represent a flexible symbol or an uplink symbol, and D represents a downlink symbol.

Optionally, in some embodiments of this application, the symbol attributes include at least one of the following two types of symbol attributes:

a first type of symbol attributes $A_0 A_1 A_2$ DDDDDDDF, where F represents a flexible symbol, D represents a downlink symbol, and $A_0$ to $A_2$ each represent any one of a flexible symbol, an uplink symbol, and a downlink symbol; and a first type of symbol attributes $B_0$ DDDDDDDD$B_1 B_2 B_3$, where F represents a flexible symbol, D represents a downlink symbol, $B_0$ represents a flexible symbol or an uplink symbol, $B_1$ represents a flexible symbol or a downlink symbol, and $B_2$ and $B_3$ each represent any one of a flexible symbol, an uplink symbol, and a downlink symbol.

Optionally, in some embodiments of this application, the symbol attributes are $Z_0 Z_1$ DDD$C_0 C_1$ DDD$Z_2 Z_3$, where $Z_0$ represents a flexible symbol or an uplink symbol, $Z_1$ represents a flexible symbol or a downlink symbol, D represents a downlink symbol, $C_0$ and $C_1$ each represent a flexible symbol or a downlink symbol, $Z_2$ represents a flexible symbol or a downlink symbol, and $Z_3$ represents any one of a flexible symbol, an uplink symbol, and a downlink symbol.

Optionally, in some embodiments of this application, the symbol attributes are $C_0$ DD DD $C_1 C_2$ DD DD $C_3$, where $C_0$ to $C_3$ each represent a flexible symbol or a downlink symbol, and D represents a downlink symbol.

Optionally, in some embodiments of this application, symbols indicated by the slot format index are 12 symbols in 14 symbols indicated by the row in the slot format table.

Optionally, in some embodiments of this application, the 12 symbols are first 12 symbols, last 12 symbols, or the first symbol to the sixth symbol and the eighth symbol to the thirteenth symbol in the 14 symbols.

Optionally, in some embodiments of this application, symbol attributes of 14 symbols indicated by the slot format index include: A downlink symbol D and an uplink symbol U are two consecutive symbols, and a symbol index of the downlink symbol D is less than a symbol index of the uplink symbol U. A subcarrier spacing corresponding to a slot format indicated by the slot format index is less than or equal to a subcarrier spacing corresponding to the slot format of the extended cyclic prefix.

Optionally, in some embodiments of this application, the communication apparatus further includes a receiving module 530, further configured to receive first indication information, where the first indication information is used to indicate that the terminal device supports receiving a synchronization broadcast block (SS/PBCH block) in a slot with the extended cyclic prefix.

Optionally, in some embodiments of this application, the sending module 520 is further configured to send second indication information, where the second indication information is used to indicate the terminal device to receive the synchronization broadcast block (SS/PBCH block) in the slot with the extended cyclic prefix.

Optionally, in some embodiments of this application, the subcarrier spacing corresponding to the slot format indicated by the slot format index is less than or equal to the subcarrier spacing corresponding to the slot format of the extended cyclic prefix.

Optionally, in some embodiments of this application, the subcarrier spacing corresponding to the slot format of the extended cyclic prefix is any one of a 30 kHz subcarrier spacing, a 60 kHz subcarrier spacing, a 120 kHz subcarrier spacing, and a 240 kHz subcarrier spacing.

It should be understood that, for specific processes in which the units in the apparatus 500 perform the foregoing corresponding steps, refer to the foregoing descriptions related to the network device with reference to the embodiments shown in FIG. 3 to FIG. 5 and the related embodiments of the method 200. For brevity, details are not described herein again.

Optionally, the sending module (unit) 520 and the receiving module (unit) 530 are configured to perform steps of receiving information and sending information by the network device in the foregoing method embodiments. Optionally, the communication apparatus 500 may further include a storage module, configured to store instructions executed by the processing module 510, the sending module 520, and the receiving module 530. The processing module 510, the sending module 520, and the receiving module 530 are communicatively connected to the storage module. The storage module stores instructions. The processing module 510 is configured to execute the instructions stored in the storage module. The sending module 520 and the receiving module 530 perform specific signal receiving and sending under driving of the processing module 510.

Figure 9:
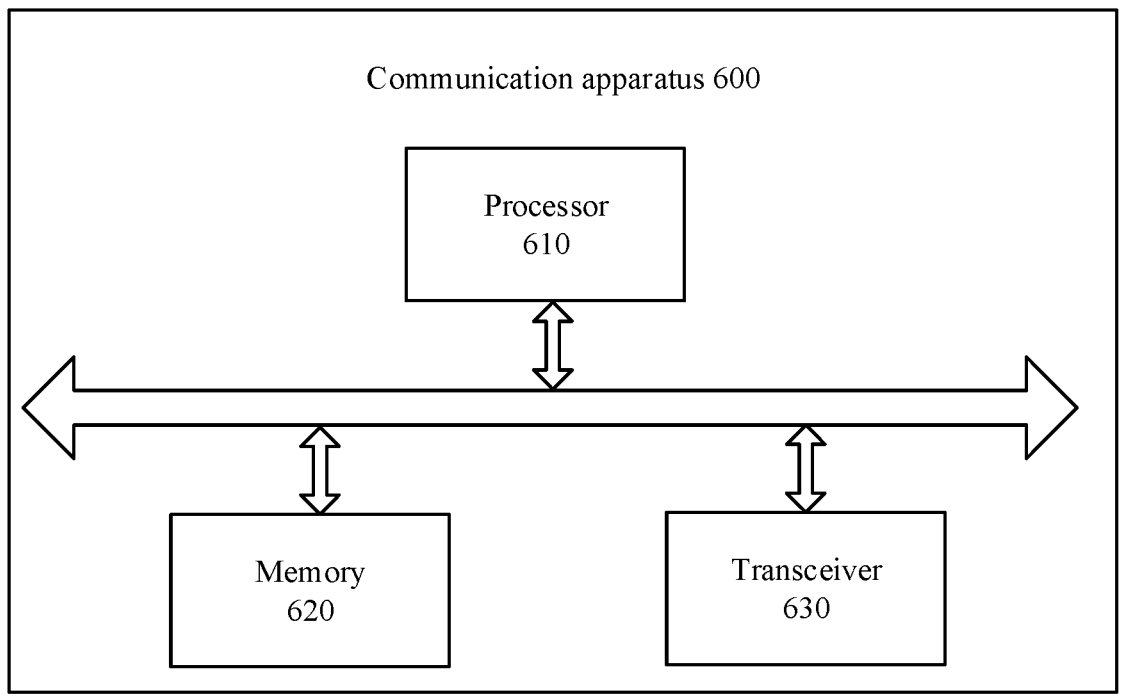
FIG. 9 is a schematic diagram of another communication apparatus according to an embodiment of this application.

It should be understood that the sending module 520 and the receiving module 530 may be a transceiver, an input/output interface, or an interface circuit. The storage module may be a memory. The processing module 510 may be implemented by a processor. As shown in FIG. 9, a communication apparatus 600 may include a processor 610, a memory 620, and a transceiver 630.

The communication apparatus 500 shown in FIG. 8 or the communication apparatus 600 shown in FIG. 9 can implement steps performed by the network device in the embodiments of the foregoing method 200. For similar descriptions, refer to the descriptions in the foregoing corresponding methods. To avoid repetition, details are not described herein again.

The communication apparatus 500 shown in FIG. 8 or the communication apparatus 600 shown in FIG. 9 may be a network device.

It should be further understood that division into the units in the apparatus is merely division into logical functions. During actual implementation, all or some of the units may be integrated into one physical entity, or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, units may be separately disposed processing elements, or may be integrated into a chip of the apparatus for implementation. In addition, the units may be stored in a memory in a program form, and is invoked by a processing element of the apparatus to perform functions of the units. The processing element herein may also be referred to as a processor, and may be an integrated circuit having a signal processing capability. In an implementation process, steps in the foregoing methods or the foregoing units may be implemented by using a hardware integrated logic circuit in the processor element, or may be implemented in a form in which the processing element invokes software.

For example, a unit in any one of the foregoing apparatuses may be one or more integrated circuits configured to implement the foregoing methods, for example, one or more application-specific integrated circuits (application-specific integrated circuits, ASICs), one or more digital signal processors (digital signal processors, DSPs), one or more field programmable gate arrays (field programmable gate arrays, FPGAs), or a combination of at least two of these integrated circuits. For another example, when the units in the apparatus may be implemented in a form in which a processing element schedules a program, the processing element may be a general-purpose processor, for example, a central processing unit (central processing unit, CPU) or another processor that can invoke the program. For another example, these units may be integrated together and implemented in a form of a system-on-a-chip (system-on-a-chip, SOC).

Figure 10:
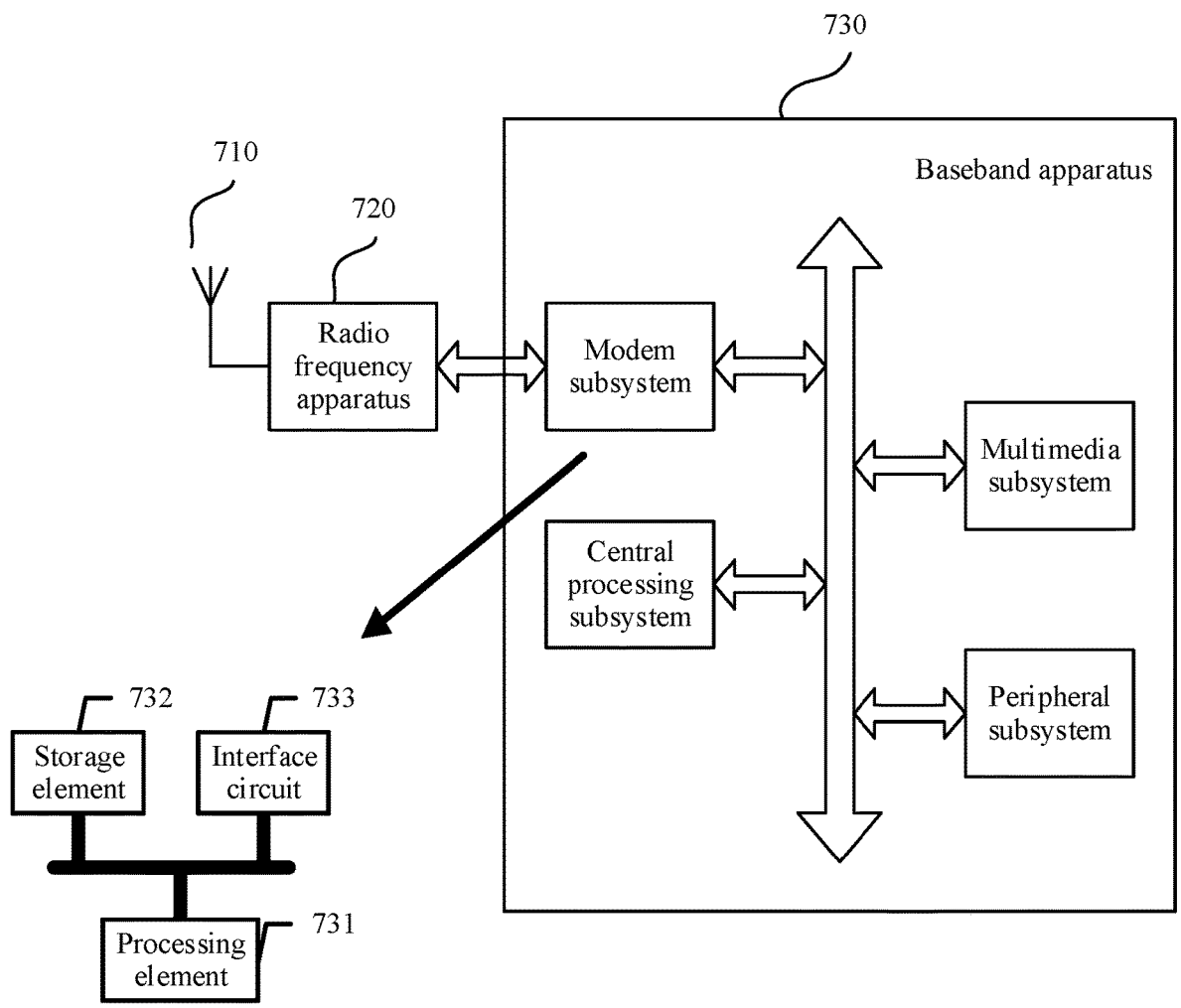
FIG. 10 is a schematic diagram of a terminal device according to an embodiment of this application.

FIG. 10 is a schematic diagram of a structure of a terminal device according to an embodiment of this application. The terminal device may be the terminal device in the foregoing embodiments, and is configured to implement the operations of the terminal device in the foregoing embodiments. As shown in FIG. 10, the terminal device includes an antenna 710, a radio frequency apparatus 720, and a baseband apparatus 730. The antenna 710 is connected to the radio frequency apparatus 720. In a downlink direction, the radio frequency apparatus 720 receives, through the antenna 710, information sent by a network device, and sends the information, sent by the network device, to the baseband apparatus 730 for processing. In an uplink direction, the baseband apparatus 730 processes information of the terminal device, and sends the information to the radio frequency apparatus 720. The radio frequency apparatus 720 processes the information of the terminal device, and then sends the processed information to the network device through the antenna 710.

The baseband apparatus 730 may include a modem subsystem, configured to process data at each communication protocol layer. The baseband apparatus 730 may further include a central processing subsystem, configured to implement processing on an operating system and an application layer of the terminal. In addition, the baseband apparatus 730 may further include another subsystem, for example, a multimedia subsystem or a peripheral subsystem. The multimedia subsystem is configured to control a camera or display of a screen of the terminal device, and the peripheral subsystem is configured to implement a connection to another device. The modem subsystem may be an independent chip. Optionally, the foregoing apparatus used in the terminal may be located in the modem subsystem.

The modem subsystem may include one or more processing elements 731, for example, include one main control CPU and another integrated circuit. In addition, the modem subsystem may further include a storage element 732 and an interface circuit 733. The storage element 732 is configured to store data and a program. However, a program used to perform the methods performed by the terminal device in the foregoing methods may not be stored in the storage element 732, but is stored in a memory outside the modem subsystem. The interface circuit 733 is configured to communicate with another subsystem. The foregoing apparatus used for the terminal device may be located in the modem subsystem, and the modem subsystem may be implemented by using a chip. The chip includes at least one processing element and an interface circuit. The processing element is configured to perform the steps of any one of the methods performed by the terminal device. The interface circuit is configured to communicate with another apparatus. In an implementation, the units in the terminal device for implementing the steps in the foregoing methods may be implemented by scheduling a program by a processing element. For example, the apparatus used for the terminal device includes a processing element and a storage element. The processing element invokes a program stored in the storage element, to perform the methods performed by the terminal in the foregoing method embodiments. The storage element may be a storage element that is on the same chip as the processing unit, that is, an on-chip storage element.

In another implementation, a program used to perform the method performed by the terminal device in the foregoing method may be in a storage element that is on a different chip from the processing unit, that is, an off-chip storage element. In this case, the processing element invokes or loads the program from the off-chip storage element to an on-chip storage element, to invoke and perform the method performed by the terminal in the foregoing method embodiments.

In still another implementation, units in the terminal device for implementing the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. The integrated circuits may be integrated together to form a chip.

The units in the terminal device for implementing the steps in the foregoing methods may be integrated together, and implemented in a form of a system-on-a-chip (system-on-a-chip, SOC). The SOC chip is configured to implement the foregoing methods.

Figure 11:
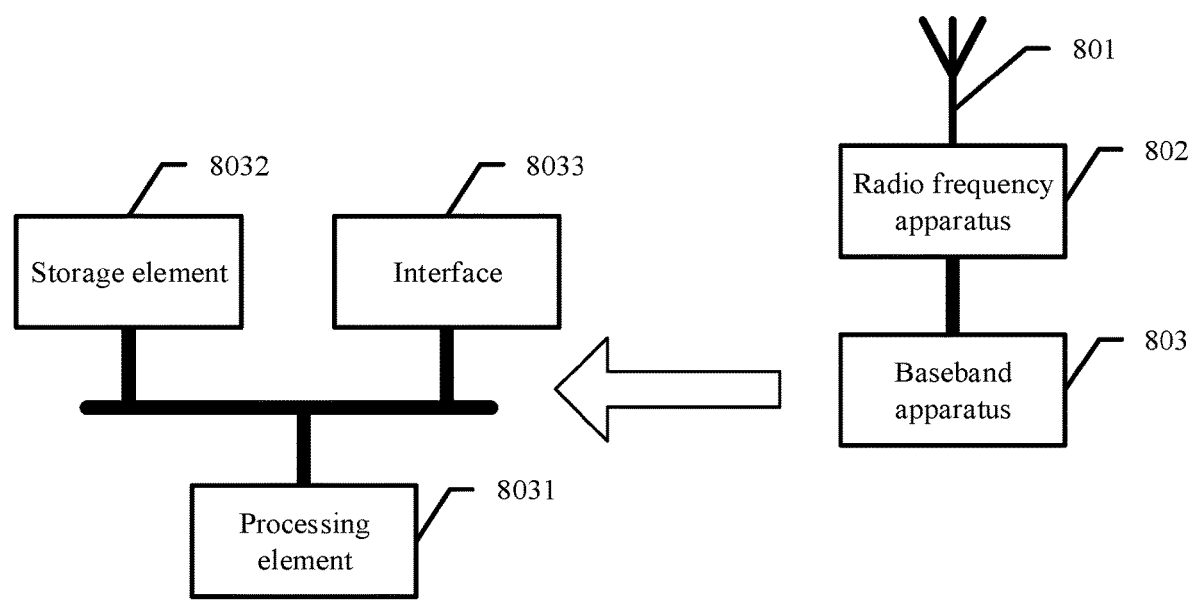
FIG. 11 is a schematic diagram of a network device according to an embodiment of this application.

FIG. 11 is a schematic diagram of a structure of a network device according to an embodiment of this application. The network device is configured to implement the operations of the network device in the foregoing embodiments. As shown in FIG. 11, the network device includes an antenna 801, a radio frequency apparatus 802, and a baseband apparatus 803. The antenna 801 is connected to the radio frequency apparatus 802. In an uplink direction, the radio frequency apparatus 802 receives, through the antenna 801, information sent by a terminal, and sends the information, sent by the terminal device, to the baseband apparatus 803 for processing. In a downlink direction, the baseband apparatus 803 processes information of the terminal, and sends the information to the radio frequency apparatus 802. The radio frequency apparatus 802 processes the information of the terminal device, and then sends the processed information to the terminal through the antenna 801.

The baseband apparatus 803 may include one or more processing elements 8031, for example, include one main control CPU and another integrated circuit. In addition, the baseband apparatus 803 may further include a storage element 8032 and an interface 8033. The storage element 8032 is configured to store a program and data. The interface 8033 is configured to exchange information with the radio frequency apparatus 802. The interface is, for example, a common public radio interface (common public radio interface, CPRI). The foregoing apparatus used for the network device may be located in the baseband apparatus 803. For example, the foregoing apparatus used for the network device may be a chip on the baseband apparatus 803. The chip includes at least one processing element and an interface circuit. The processing element is configured to perform the steps of any one of the methods performed by the network device. The interface circuit is configured to communicate with another apparatus. In an implementation, the units in the network device for implementing the steps in the foregoing method may be implemented by scheduling a program by the processing element. For example, the apparatus used for the network device includes a processing element and a storage element. The processing element invokes a program stored in the storage element, to perform the method performed by the network device in the foregoing method embodiments. The storage element may be a storage element on the same chip as the processing element, that is, an on-chip storage element; or may be a storage element that is on a different chip from the processing element, that is, an off-chip storage element.

In another implementation, the units in the network device for implementing steps in the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. The integrated circuits may be integrated together to form a chip.

The units of the network device that implement the steps in the foregoing methods may be integrated together, and implemented in a form of a system-on-a-chip. For example, the baseband apparatus includes the SOC chip, configured to implement the foregoing methods.

The terminal device and the network device in the foregoing apparatus embodiments may exactly correspond to the terminal device or the network device in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

An embodiment of this application further provides a communication system. The communication system includes the foregoing terminal device and the foregoing network device.

An embodiment of this application further provides a computer-readable medium, configured to store computer program code. The computer program includes instructions used to perform the slot format indication method in the foregoing method 200 in the embodiments of this application. The readable medium may be a read-only memory (read-only memory, ROM) or a random access memory (random access memory, RAM). This is not limited in this embodiment of this application.

This application further provides a computer program product. The computer program product includes instructions. When the instructions are executed, the terminal device and the network device are enabled to perform operations corresponding to the terminal device and the network device in the foregoing methods.

An embodiment of this application further provides a system chip. The system chip includes a processing unit and a communication unit. The processing unit may be, for example, a processor. The communication unit may be, for example, an input/output interface, a pin, or a circuit. The processing unit may execute computer instructions, so that the chip in a communication apparatus performs any slot format indication method provided in the foregoing embodiments of this application.

Optionally, the computer instructions are stored in a storage unit.

Optionally, the storage unit is a storage unit in the chip, for example, a register or a cache; or the storage unit may be a storage unit in a terminal but outside the chip, for example, a read-only memory (read-only memory, ROM), another type of static storage device capable of storing static information and instructions, or a random access memory (random access memory, RAM). The processor mentioned in any of the foregoing descriptions may be a CPU, a microprocessor, an ASIC, or one or more integrated circuits for controlling program execution of the foregoing feedback information transmission method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in the embodiments of this application may be a volatile memory or a non-volatile memory, or may include both a volatile memory and a non-volatile memory. The nonvolatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM and is used as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The terms "system" and "network" may be used interchangeably in this specification. The term "and/or" in this specification describes only an association relationship for describing associated objects and represents that there may be three relationships. For example, A and/or B may represent the following three cases: Only A exists, both A and B exist, and only B exists. In addition, the character "/" in this specification usually indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the terms "uplink" and the "downlink" are only used to describe transmission directions of data/information, and neither a specific start device nor a specific end device of the data/information transmission is limited.

Names are assigned to various objects that may appear in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a usage habit. Technical meanings of technical terms in this application should be understood and determined mainly based on functions and technical effects reflected/performed by the technical terms in the technical solutions.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

All or some of the methods in the embodiments of this application may be implemented by software, hardware, firmware, or any combination thereof. When the software is used to implement the embodiments, all or some of the embodiments may be implemented in a form of a computer program product. The computer program product includes one or more computer programs or instructions. When the computer programs or the instructions are loaded and executed on a computer, the procedures or functions in the embodiments of this application are completely or partially generated. The computer may be a general-purpose computer, a dedicated computer, a computer network, or other programmable apparatuses. The computer programs or instructions may be stored in a computer-readable storage medium, or may be transmitted by using a computer-readable storage medium. The computer-readable storage medium may be any usable medium accessible by a computer, or a data storage device, such as a server integrating one or more usable media.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed system, apparatuses, and methods may be implemented in other manners. For example, the described apparatus embodiments are merely examples. For example, division into units is merely logical function division and may be other division during actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A slot format indication method, comprising:
   sending, by a terminal device, first indication information, wherein the first indication information indicates that the terminal device supports receiving a synchronization broadcast block (SS/PBCH block) in a slot with an extended cyclic prefix;
   receiving, by the terminal device, a slot format index, wherein the slot format index indicates a row in a slot format table, the row in the slot format table indicates symbol attributes respectively corresponding to at least 12 symbols, the symbol attribute comprises a location of an uplink symbol U, a downlink symbol D, or a flexible symbol F; and
   determining, by the terminal device, a slot format of the extended cyclic prefix based on the slot format index, wherein the slot format of the extended cyclic prefix comprises a downlink symbol D, and at least one uplink symbol U or at least one flexible symbol F.

2. The method according to claim 1, wherein the method further comprises:
   receiving, by the terminal device, second indication information, wherein the second indication information indicates the terminal device to receive a synchronization broadcast block (SS/PBCH block) in a slot with the extended cyclic prefix.

3. The method according to claim 1, wherein the symbol attributes comprise at least one of the following two types of symbol attributes:
   a first type of symbol attributes $Y_0 Y_1 Y_2 Z_0 DDDDDDDD Y_3 Y_4$, wherein D represents a downlink symbol, $Y_0$ to $Y_3$ each represents one of a flexible symbol, an uplink symbol, or a downlink symbol, $Z_0$ represents a flexible symbol or a downlink symbol, and $Y_4$ represents a flexible symbol or an uplink symbol; and
   a second type of symbol attributes $X_0 X_1 DDDDDDDDX_2 X_3 X_4 X_5$, wherein D represents a downlink symbol, $X_0$ and $X_1$ each represents a flexible symbol or an uplink symbol, $X_2$ represents a flexible symbol or a downlink symbol, $X_3$ represents a flexible symbol or an uplink symbol, and $X_4$ and $X_5$ each represents one of a flexible symbol, an uplink symbol, or a downlink symbol.

4. The method according to claim 1, wherein the symbol attributes are $Z_0 Z_1$ DDDD $Z_2 Z_3$ DDDD $Z_4 Z_5$, wherein $Z_0$ to $Z_5$ each represents a flexible symbol or an uplink symbol, and D represents a downlink symbol.

5. The method according to claim 1, wherein a value of the slot format index is greater than or equal to 56 and less than or equal to 254.

6. A slot format indication method, comprising:
   receiving, by a network device, first indication information, wherein the first indication information indicates that a terminal device supports receiving a synchronization broadcast block (SS/PBCH block) in a slot with an extended cyclic prefix;
   determining, by the network device, a slot format index based on a slot format of the extended cyclic prefix, wherein the slot format of the extended cyclic prefix comprises a downlink symbol D, and at least one uplink symbol U or at least one flexible symbol F, the slot format index indicates a row in a slot format table, the row in the slot format table indicates symbol attributes respectively corresponding to at least 12 symbols, the symbol attribute comprises a location of an uplink symbol U, a downlink symbol D, or a flexible symbol F; and
   sending, by the network device, the slot format index.

7. The method according to claim 6, wherein the method further comprises:
   sending, by the network device, second indication information, wherein the second indication information indicates a terminal device to receive a synchronization broadcast block (SS/PBCH block) in a slot with the extended cyclic prefix.

8. The method according to claim 6, wherein the symbol attributes comprise at least one of the following two types of symbol attributes:
   a first type of symbol attributes $Y_0 Y_1 Y_2 Z_0 DDDDDDDD Y_3 Y_4$, wherein D represents a downlink symbol, $Y_0$ to $Y_3$ each represents one of a flexible symbol, an uplink symbol, or a downlink symbol, $Z_0$ represents a flexible symbol or a downlink symbol, and $Y_4$ represents a flexible symbol or an uplink symbol; and
   a second type of symbol attributes $X_0 X_1 DDDDDDDDX_2 X_3 X_4 X_5$, wherein D represents a downlink symbol, $X_0$ and $X_1$ each represents a flexible symbol or an uplink symbol, $X_2$ represents a flexible symbol or a downlink symbol, $X_3$ represents a flexible symbol or an uplink symbol, and $X_4$ and $X_5$ each represents one of a flexible symbol, an uplink symbol, or a downlink symbol.

9. The method according to claim 6, wherein the symbol attributes are $Z_0 Z_1$ DDDD $Z_2 Z_3$ DDDD $Z_4 Z_5$, wherein $Z_0$ to $Z_5$ each represents a flexible symbol or an uplink symbol, and D represents a downlink symbol.

10. The method according to claim 6, wherein a value of the slot format index is greater than or equal to 56 and less than or equal to 254.

11. A communication apparatus, comprising:
a receiver;
at least one processor; and
one or more memories coupled to the at least one processor and storing programming instructions for execution by the at least one processor to:
send first indication information, wherein the first indication information indicates that the communication apparatus supports receiving a synchronization broadcast block (SS/PBCH block) in a slot with an extended cyclic prefix;
receive, by using the receiver, a slot format index, wherein the slot format index indicates a row in a slot format table, the row in the slot format table indicates symbol attributes respectively corresponding to at least 12 symbols, the symbol attribute comprises a location of an uplink symbol U, a downlink symbol D, or a flexible symbol F; and
determine a slot format of the extended cyclic prefix based on the slot format index received by the receiver, wherein the slot format of the extended cyclic prefix comprises a downlink symbol D, and at least one uplink symbol U or at least one flexible symbol F.

12. The apparatus according to claim 11, wherein the programming instructions, when executed by the at least one processor, cause the apparatus to receive, by using the receiver, second indication information, wherein the second indication information indicates the apparatus to receive a synchronization broadcast block (SS/PBCH block) in a slot with the extended cyclic prefix.

13. The apparatus according to claim 11, wherein the symbol attributes comprise at least one of the following two types of symbol attributes:
- a first type of symbol attributes $Y_0 Y_1 Y_2 Z_0 DDDDDDDD Y_3 Y_4$, wherein D represents a downlink symbol, $Y_0$ to $Y_3$ each represents one of a flexible symbol, an uplink symbol, or a downlink symbol, $Z_0$ represents a flexible symbol or a downlink symbol, and $Y_4$ represents a flexible symbol or an uplink symbol; and
- a second type of symbol attributes $X_0 X_1 DDDDDDDDX_2 X_3 X_4 X_5$, wherein D represents a downlink symbol, $X_0$ and $X_1$ each represents a flexible symbol or an uplink symbol, $X_2$ represents a flexible symbol or a downlink symbol, $X_3$ represents a flexible symbol or an uplink symbol, and $X_4$ and $X_5$ each represents one of a flexible symbol, an uplink symbol, or a downlink symbol.

14. The apparatus according to claim 11, wherein the symbol attributes are
$Z_0 Z_1 DDDD Z_2 Z_3 DDDD Z_4 Z_5$, wherein $Z_0$ to $Z_5$ each represents a flexible symbol or an uplink symbol, and D represents a downlink symbol.

15. The communication apparatus according to claim 11, wherein a value of the slot format index is greater than or equal to 56 and less than or equal to 254.

16. A communication apparatus, comprising:
a transmitter;
at least one processor; and
one or more memories coupled to the at least one processor and storing programming instructions for execution by the at least one processor to:
receive first indication information, wherein the first indication information indicates that a terminal device supports receiving a synchronization broadcast block (SS/PBCH block) in a slot with an extended cyclic prefix;
determine a slot format index based on a slot format of the extended cyclic prefix, wherein the slot format of the extended cyclic prefix comprises a downlink symbol D, and at least one uplink symbol U or at least one flexible symbol F, the slot format index indicates a row in a slot format table, the row in the slot format table indicates symbol attributes respectively corresponding to at least 12 symbols, the symbol attribute comprises a location of an uplink symbol U, a downlink symbol D, or a flexible symbol F; and
send, by using the transmitter, the slot format index determined by the processor.

17. The apparatus according to claim 16, wherein the programming instructions, when executed by the at least one processor, cause the apparatus to send, by using the transmitter, second indication information, wherein the second indication information indicates a terminal device to receive a synchronization broadcast block (SS/PBCH block) in a slot with the extended cyclic prefix.

18. The apparatus according to claim 16, wherein the symbol attributes comprise at least one of the following two types of symbol attributes:
- a first type of symbol attributes $Y_0 Y_1 Y_2 Z_0 DDDDDDDD Y_3 Y_4$, wherein D represents a downlink symbol, $Y_0$ to $Y_3$ each represents one of a flexible symbol, an uplink symbol, or a downlink symbol, $Z_0$ represents a flexible symbol or a downlink symbol, and $Y_4$ represents a flexible symbol or an uplink symbol; and
- a second type of symbol attributes $X_0 X_1 DDDDDDDDX_2 X_3 X_4 X_5$, wherein D represents a downlink symbol, $X_0$ and $X_1$ each represents a flexible symbol or an uplink symbol, $X_2$ represents a flexible symbol or a downlink symbol, $X_3$ represents a flexible symbol or an uplink symbol, and $X_4$ and $X_5$ each represents one of a flexible symbol, an uplink symbol, or a downlink symbol.

19. The apparatus according to claim 16, wherein the symbol attributes are $Z_0 Z_1 DDDD Z_2 Z_3 DDDD Z_4 Z_5$, wherein $Z_0$ to $Z_5$ each represents a flexible symbol or an uplink symbol, and D represents a downlink symbol.

20. The communication apparatus according to claim 16, wherein a value of the slot format index is greater than or equal to 56 and less than or equal to 254.

* * * * *